US008269755B2

(12) United States Patent
Minami

(10) Patent No.: US 8,269,755 B2
(45) Date of Patent: Sep. 18, 2012

(54) DISPLAY APPARATUS AND ELECTRONIC INSTRUMENT WITH AN EXTINCTION POTENTIAL AND PERIOD FOR A LIGHT EMITTING DEVICE

(75) Inventor: Tetsuo Minami, Tokyo (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 12/725,998

(22) Filed: Mar. 17, 2010

(65) Prior Publication Data

US 2010/0245334 A1 Sep. 30, 2010

(30) Foreign Application Priority Data

Mar. 25, 2009 (JP) ................................ 2009-073978
Nov. 12, 2009 (JP) ................................ 2009-258645

(51) Int. Cl.
*G06F 3/038* (2006.01)

(52) U.S. Cl. ........................................ 345/208; 345/82

(58) Field of Classification Search .............. 345/76–82, 345/204, 208–213; 315/169.1–169.3; 359/249
See application file for complete search history.

(56) References Cited

U.S. PATENT DOCUMENTS

2008/0030436 A1 2/2008 Iida et al.
2008/0231625 A1* 9/2008 Minami et al. ................ 345/212
2009/0207160 A1* 8/2009 Shirasaki et al. ............. 345/212

FOREIGN PATENT DOCUMENTS

JP 2008-033193 2/2008

* cited by examiner

*Primary Examiner* — Liliana Cerullo
(74) *Attorney, Agent, or Firm* — SNR Denton US LLP

(57) ABSTRACT

A display apparatus includes: a plurality of pixel circuits; drive scan lines which supply the same power supply potential to each group of the plurality of pixel circuits, the group having a plurality of pixel circuits for a plurality of successive rows; and a power supply circuit which, during an extinction period for extinguishing light-emitting devices in pixel circuits belonging to each group, supplies a high-level power supply potential to the respective pixel circuits belonging to the group related to the extinction period so as to switch the power supply potential to the high-level power supply potential higher than the power supply potential, wherein each of the plurality of pixel circuits includes a storage capacitor which retains a voltage corresponding to a video signal, a drive transistor which supplies a current based on the voltage retained in the storage capacitor to the corresponding light-emitting device by receiving the power supply potential supplied to the corresponding drive scan line, a light-emitting device which emits light in accordance with the current supplied from the drive transistor, and a write transistor which, during the extinction period, gives an extinction potential for extinguishing the light-emitting device to a gate terminal of the drive transistor, and then writes the voltage corresponding to the video signal to the storage capacitor.

6 Claims, 23 Drawing Sheets

FIG.7A TP8
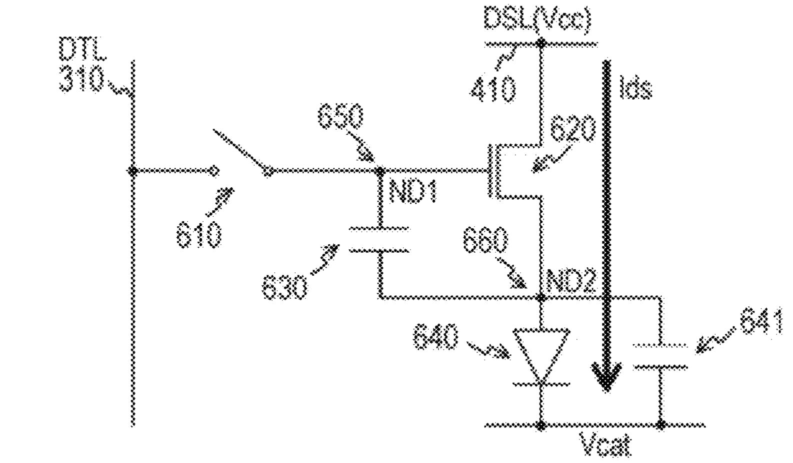
FIG.7B TP1
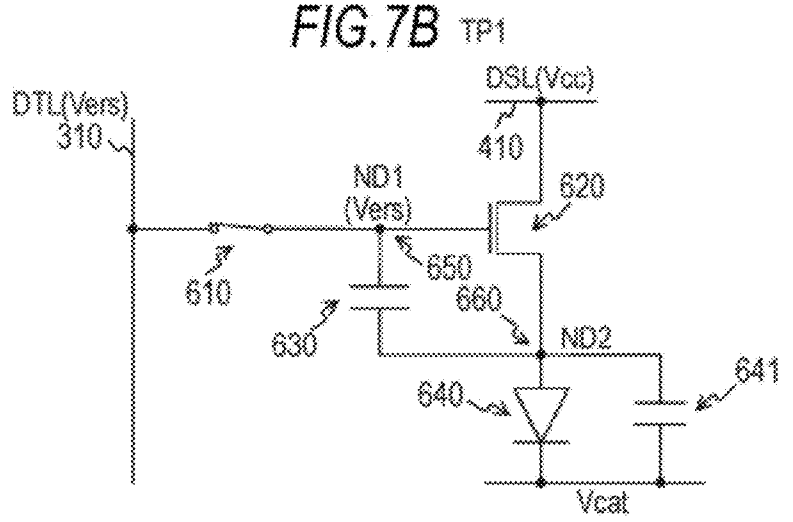
FIG.7C TP2
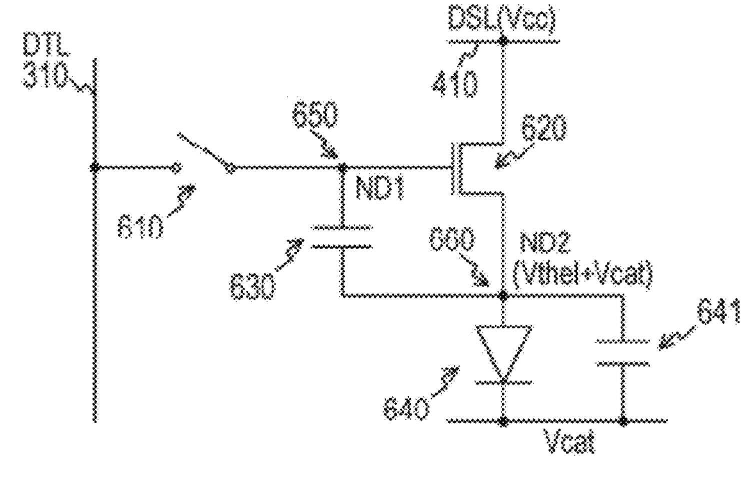

FIG.8A TP3
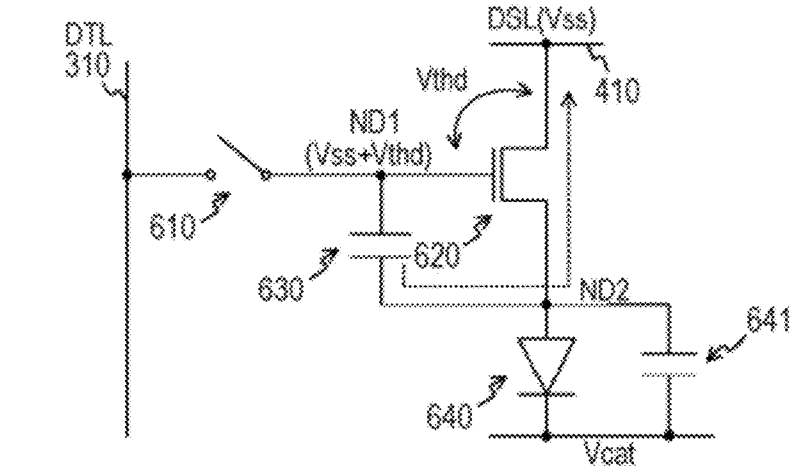
FIG.8B TP4
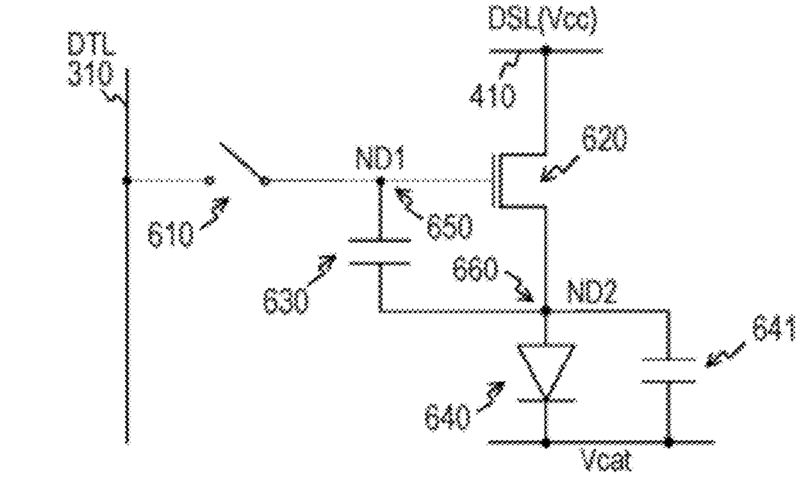
FIG.8C TP5
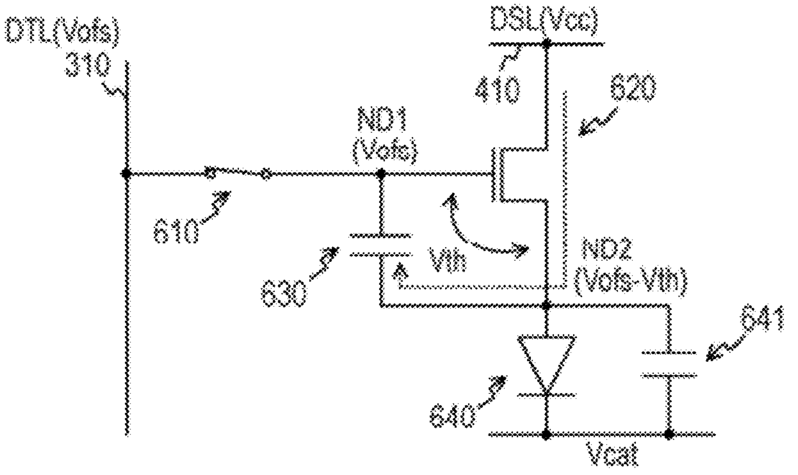

FIG.9A TP6
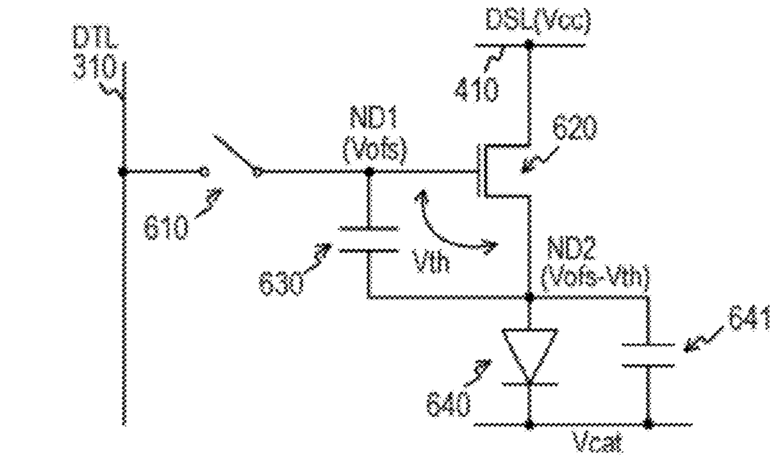
FIG.9B TP7
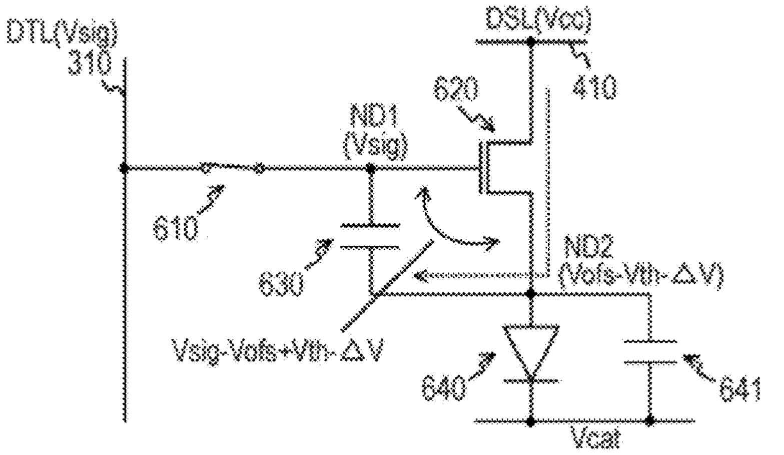
FIG.9C TP8
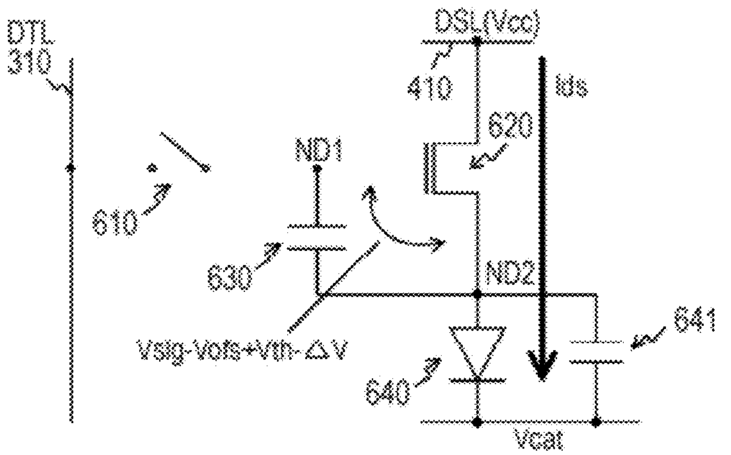

740

| | CURRENT CHARACTERISTIC | |
|---|---|---|
| | NO Vcc_H SWITCHING | Vcc_H SWITCHING |
| 731 INTEGRATION VALUE OF FIRST ROW | $2.40 \times 10^{-15}$ | $2.61 \times 10^{-15}$ |
| 732 INTEGRATION VALUE OF 48TH ROW | $2.35 \times 10^{-15}$ | $2.57 \times 10^{-15}$ |
| 733 DIFFERENCE RATIO | 2.2% | 1.2% |

DISPLAY APPARATUS AND ELECTRONIC INSTRUMENT WITH AN EXTINCTION POTENTIAL AND PERIOD FOR A LIGHT EMITTING DEVICE

BACKGROUND OF THE INVENTION

1. Field of the Invention

The present invention relates to a display apparatus, and in particular, to a display apparatus using light-emitting devices for pixels and an electronic instrument.

2. Description of the Related Art

In recent years, a planar self-luminous type display apparatus has been actively developed in which an organic electroluminescence (EL) device is used as a light-emitting device. The organic EL device emits light when an electric field is applied to an organic thin film. The organic EL device is of a low-voltage drive type, so good visibility is achieved. This is expected to contribute to reduction in weight and thickness or low power consumption of the display apparatus.

In a display apparatus using the organic EL device, the electric field applied to the organic thin film is controlled by a drive transistor constituting a pixel circuit. On the other hand, there are variations in threshold value and mobility between drive transistors. For this reason, there are demands for threshold correction processing and mobility correction processing so as to correct the variations. Thus, a display apparatus having such correction functions has been contrived. For example, a display apparatus has been suggested which has a function for correcting the variations in threshold voltage and mobility between drive transistors constituting pixel circuits by switching power supply signals and data signals supplied to the pixel circuits (for example, see JP-A-2008-33193 (FIG. 4A)).

SUMMARY OF THE INVENTION

In the related art, the variations in threshold voltage and mobility between the drive transistors constituting the pixel circuits can be corrected. In this case, to switch power supply signals, a driver for switching power supply signals should be provided for each row, which causes an increase in cost of the display apparatus. In contrast, the number of drivers is reduced by switching power supply signals for every plural number of rows. However, in such a configuration, a light-emitting device is extinguished without depending on switching of power supply signals, so it takes a lot of time to completely extinguish the light-emitting device due to the effect of parasitic capacitance of the light-emitting device or the like. In such a case, gradation may occur in a display image.

It is desirable to reduce gradation in a display image.

A first embodiment of the invention provides a display apparatus and an electronic instrument. The display apparatus and the electronic instrument include a plurality of pixel circuits, drive scan lines which supply the same power supply potential to each group of the plurality of pixel circuits, the group having a plurality of pixel circuits for a plurality of successive rows, and a power supply circuit which, during an extinction period for extinguishing light-emitting devices in pixel circuits belonging to each group, supplies a high-level power supply potential to the respective pixel circuits belonging to the group related to the extinction period so as to switch the power supply potential to the high-level power supply potential higher than the power supply potential. Each of the plurality of pixel circuits includes a storage capacitor which retains a voltage corresponding to a video signal, a drive transistor which supplies a current based on the voltage retained in the storage capacitor to the corresponding light-emitting device by receiving the power supply potential supplied to the corresponding drive scan line, a light-emitting device which emits light in accordance with the current supplied from the drive transistor, and a write transistor which, during the extinction period, gives an extinction potential for extinguishing the light-emitting device to a gate terminal of the drive transistor, and then writes the voltage corresponding to the video signal to the storage capacitor. Therefore, during the extinction period for extinguishing the light-emitting devices in a plurality of rows of pixel circuits connected to one drive scan line, the potential at an input terminal of the light-emitting device temporarily increases by switching the power supply potential to the high-potential power supply potential.

In the first embodiment, the power supply circuit may supply the high-level power supply potential after, during the extinction period, the extinction potential is given to gate terminals of drive transistors in pixel circuits of a last row to be extinguished by line-sequential scanning from among the pixel circuits belonging to the group related to the extinction period. Therefore, the high-level power supply potential can be supplied by the power supply circuit after the extinction potential is given to the gate terminals of the drive transistors in the last row of pixel circuits from among a plurality of rows of pixel circuits connected to one drive scan line.

In the first embodiment, the power supply circuit may supply the high-level power supply potential after, during the extinction period, the extinction potential is given to the gate terminal of the drive transistor of each of pixel circuits in a row before a predetermined number of rows from a last row to be extinguished by line-sequential scanning from among the pixel circuits belonging to the group related to the extinction period. Therefore, the high-level power supply potential can be supplied by the power supply circuit after the extinction potential is given to the gate terminals of the drive transistors in the pixel circuits of the row before a predetermined number of rows from the last row to be extinguished from among a plurality of rows of pixel circuits connected to one drive scan line.

In the first embodiment, the power supply circuit may supply the high-level power supply potential to the drive scan line by switching the power supply potential to the high-level power supply potential during the extinction period. Therefore, the power supply potential can be switched to the high-level power supply potential through the drive scan line.

In the first embodiment, the light-emitting devices may be organic electroluminescence devices. Therefore, light can be emitted from the organic electroluminescence devices.

According to the embodiment of the invention, an excellent effect is obtained in that gradation in a display image is reduced.

BRIEF DESCRIPTION OF THE DRAWINGS

FIGS. 7A to 7C are circuit diagrams schematically showing operation states of the pixel corresponding to periods TP8, TP1, and TP2, respectively.

FIGS. 8A to 8C are circuit diagrams schematically showing operation states of the pixel corresponding to periods TP3 to TP5, respectively.

FIGS. 9A to 9C are circuit diagrams schematically showing operation states of the pixel corresponding to periods TP6 to TP8.

DETAILED DESCRIPTION OF THE INVENTION

A mode for carrying out the invention (hereinafter, referred to as embodiment) will now be described. The description will be made in the following sequence.

1. First Embodiment (display control: example where power supply signal is provided with high-level power supply potential)
2. Second Embodiment (display control: example where power supply potential is switched to high-level power supply potential during light-emission period)
3. Third Embodiment (display control: application to electronic instrument)

<1. First Embodiment>

[Example of Basic Configuration of Display Apparatus]

Figure 1:
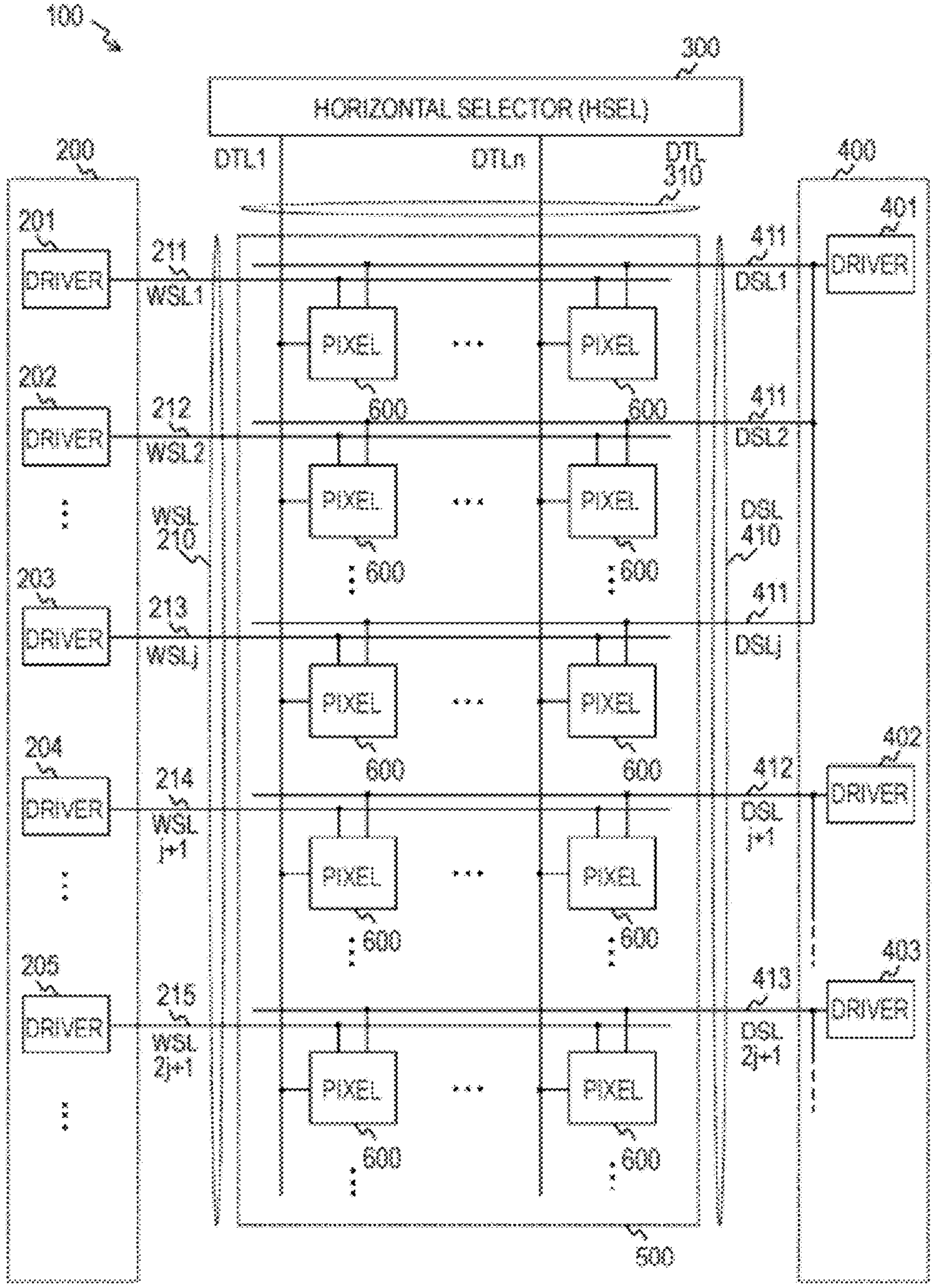
FIG. 1 is a conceptual view showing an example of the basic configuration of a display apparatus to which an embodiment of the invention is applied.

FIG. 1 is a conceptual view showing an example of a basic configuration of a display apparatus to which an embodiment of the invention is applied.

A display apparatus 100 includes a write scanner (WSCN: Write SCaNner) 200, a horizontal selector (HSEL: Horizontal SELector) 300, and a drive scanner (DSCN: Drive SCaNner) 400. The display apparatus 100 also includes a pixel array unit 500. The pixel array unit 500 includes a plurality of pixels 600 arranged in a two-dimensional n×m matrix. The display apparatus 100 is also provided with write scan lines (WSL) 210, data lines (DTL) 310, and drive scan lines (DSL) 410.

The write scan lines (WSL) 210 and the drive scan lines (DSL) 410 are formed for the respective rows of pixels 600, and are respectively connected to the write scanner (WSCN) 200 and the drive scanner (DSCN) 400. The data lines (DTL) 310 are formed for the respective columns of pixels 600, and are connected to the horizontal selector (HSEL) 300. The write scan lines (WSL) 210, the data lines (DTL) 310, and the drive scan lines (DSL) 410 are respectively connected to the pixel 600.

The write scanner (WSCN) 200 line-sequentially scans the plurality of pixels 600 arranged in a two-dimensional matrix. The write scanner (WSCN) 200 writes data signals supplied from the data lines (DTL) 310 to the pixels 600 in terms of rows. That is, the write scanner (WSCN) 200 sequentially controls write timing of the data signals from the data lines (DTL) 310 to the pixels 600 in terms of rows.

The write scanner (WSCN) 200 generates a control signal for line-sequentially scanning the timing at which the data signals are written. The write scanner (WSCN) 200 generates an on potential for writing data signals and an off potential for stopping writing of data signals as the control signal. The write scanner (WSCN) 200 generates, as the off potential, a first off potential for causing the pixels 600 to emit light and a second off potential for preventing current leakage from the data lines (DTL) 310 due to initialization of the pixels 600. That is, the write scanner (WSCN) 200 generates any one of the on potential, the first off potential, and the second off potential as the control signal. The write scanner (WSCN) 200 supplies the generated control signal to the write scan line (WSL) 210.

The write scanner (WSCN) 200 includes drivers 201 to 205 corresponding to the rows of pixels 600. Each of the drivers 201 to 205 generates a control signal for writing data signals supplied from the data lines (DTL) 310 for the pixels 600 of the corresponding row. The drivers 201 to 205 respectively supply the generated control signals to the write scan lines (WSL) 211 to 215.

The horizontal selector (HSEL) 300 selects any one of a potential of a video signal, a potential of a reference signal for correction of the threshold voltage of a drive transistor constituting each pixel 600 (threshold correction), and a potential (extinction potential) of an extinction signal for extinguishing the pixel 600. That is, the horizontal selector (HSEL) 300 selects any one of the video signal, the reference signal, and the extinction signal. The horizontal selector (HSEL) 300 supplies the selected signal to the data line (DTL) 310 as a data signal. The horizontal selector (HSEL) 300 switches a data signal on the basis of line-sequential scanning by the write scanner (WSCN) 200.

The drive scanner (DSCN) 400 supplies the same power supply signal to each group of pixel circuits of a plurality of successive rows (j rows: where j is an integer equal to or greater than 2). That is, the drive scanner (DSCN) 400 sequentially supplies a power supply signal for every plural number of drive scan lines (DSL) 410. The drive scanner (DSCN) 400 switches a power supply signal to any one of a power supply potential for supplying a current to the pixels 600 in terms of a predetermined number of rows and an initialization potential for initializing the pixels 600. The drive scanner (DSCN) 400 supplies the power supply signal to the drive scan line (DSL) 410.

The drive scanner (DSCN) 400 includes drivers 401 to 403 for every plural number of rows (j rows) (for every group). Each of the drivers 401 to 403 generates a power supply signal for a predetermined number of rows of pixels 600. The drivers 401 to 403 supply the generated power supply signals to the drive scan lines (DSL) 411 to 413. That is, the drive scan lines (DSL) 411 to 413 supplies the same power supply potentials to a plurality of pixels 600 for every plural number of rows (j rows). The drive scan lines (DSL) 411 to 413 are an example of drive scan lines described in the appended claims.

Each pixel 600 emits light in accordance with a voltage corresponding to a video signal from the data line (DTL) 310 for a predetermined time of period on the basis of a control signal from the write scan line (WSL) 210.

As described above, the drive scanner (DSCN) 400 supplies the same power supply signal for every plural number of rows of pixels 600, so the number of drivers of the drive scanner (DSCN) 400 can be reduced. Therefore, manufacturing costs of the display apparatus 100 can be reduced.

[Example of Configuration of Driver in Drive Scanner]

Figure 2A:
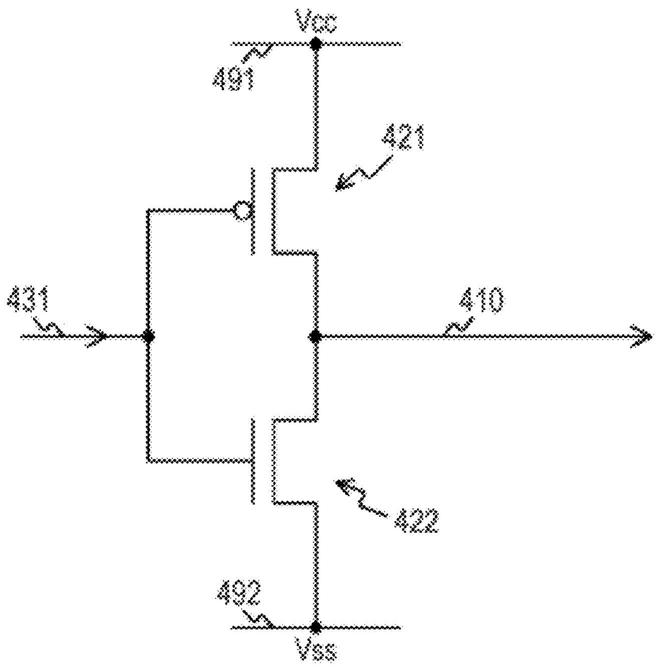
FIGS. 2A and 2B are diagrams showing an example of a method of generating a power supply signal by drivers constituting a drive scanner (DSCN) in a display apparatus.
Figure 2B:
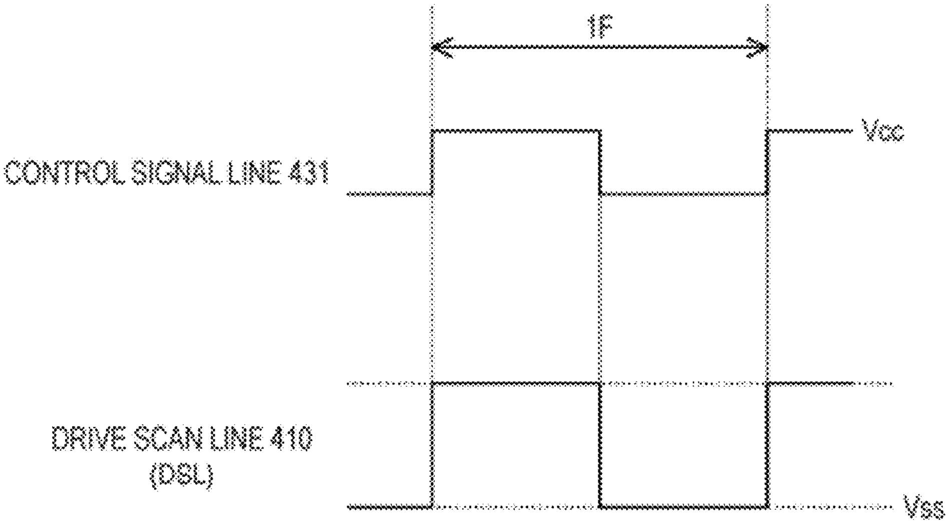

FIGS. 2A and 2B are diagrams showing an example of a method of generating a power supply signal by the drivers 401 to 403 constituting the drive scanner (DSCN) 400 in the display apparatus 100. FIG. 2A is an equivalent circuit diagram showing an example of a configuration of each of the drivers 401 to 403 of the display apparatus 100. FIG. 2B is a timing chart showing changes in potential of a control signal line 431 and a drive scan line (DSL) 410 in the configuration shown in FIG. 2A.

FIG. 2A shows a CMOS (Complementary Metal Oxide Semiconductor) inverter in which a p-type transistor 421 and an n-type transistor 422 are connected to each other in series. In this case, the drive scan line (DSL) 410, the p-type transistor 421, the n-type transistor 422, the control signal line 431, and fixed potential lines 491 and 492 are shown. In this configuration, the p-type transistor 421 has a gate terminal connected to the control signal line 431, a source terminal connected to the fixed potential line 491, and a drain terminal connected to the drive scan line (DSL) 410 and the drain terminal of the n-type transistor 422. The n-type transistor 422 has a gate terminal connected to the control signal line 431, and a source terminal connected to the fixed potential line 492.

A control signal for switching a power supply signal in the drive scan line (DSL) 410 is supplied to the control signal line 431. A potential for generating a power supply signal of the drive scan line (DSL) 410 is supplied to the fixed potential lines 491 and 492. A power supply potential (Vcc) for causing the pixel 600 to emit light and an initialization potential (Vss) for initializing the pixel 600 are respectively supplied to the fixed potential lines 491 and 492.

FIG. 2B shows changes in potential of the control signal line 431 and the drive scan line (DSL) 410 with the horizontal axis as a common time axis. Here, the operations of the drivers 401 and 403 during one field period (1F) will be described.

First, immediately before a previous field period ends, the potential of the control signal in the control signal line 431 is set at L (Low) level. During one field period (1F), the potential of the control signal in the control signal line 431 is changed to H (High) level. At this time, the p-type transistor 421 is turned on (conduction state) and the n-type transistor 422 is turned off (non-conduction state). Thus, the power supply potential (Vcc) of the fixed potential line 491 is supplied to the drive scan line (DSL) 410 as the power supply signal.

Next, the potential of the control signal in the control signal line 431 is changed from L level to H level, so the p-type transistor 421 is turned off (non-conduction state) and the n-type transistor 422 is turned on (conduction state). Thus, the initialization potential (Vss) of the fixed potential line 492 is supplied to the drive scan line (DSL) 410 as the power supply signal.

As described above, with the p-type transistor 421 and the n-type transistor 422, any one of the power supply potential (Vcc) and the initialization potential (Vss) can be supplied to the drive scan line (DSL) 410 on the basis of the control signal of the control signal line 431. Next, an example of the configuration of the horizontal selector (HSEL) 300 will be described with reference to subsequent drawings.

[Example of Configuration of Horizontal Selector]

Figure 3A:
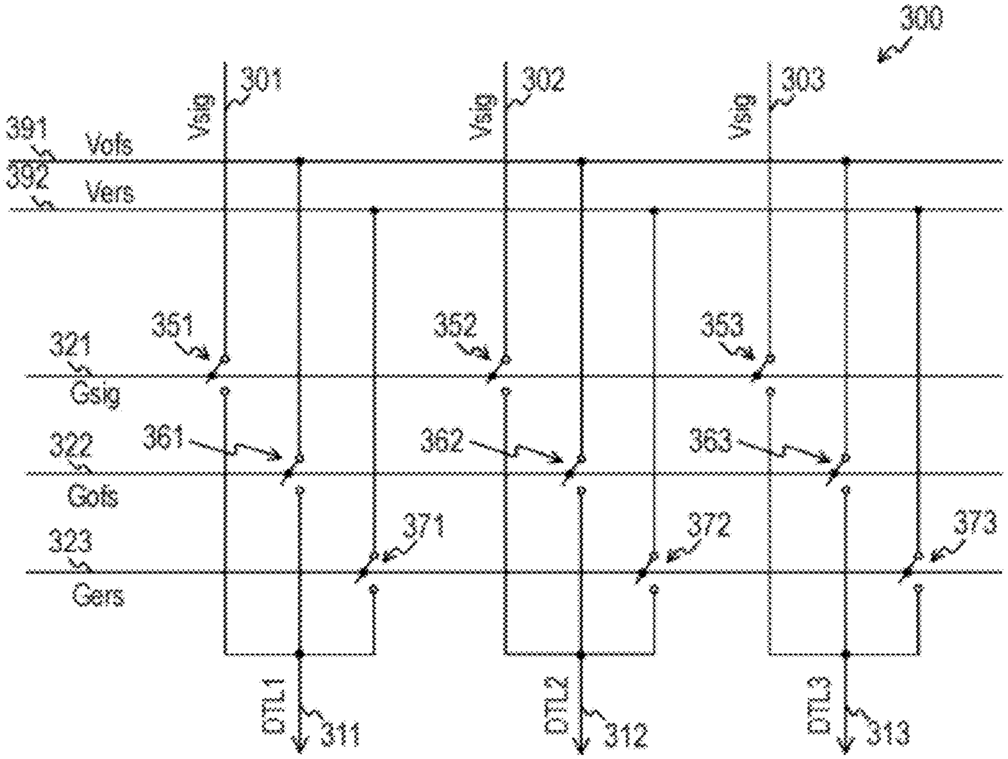
FIGS. 3A and 3B are diagrams showing an example of a method of generating data signals, which are supplied to data lines (DTL), by a horizontal selector (HSEL) in the display apparatus.
Figure 3B:
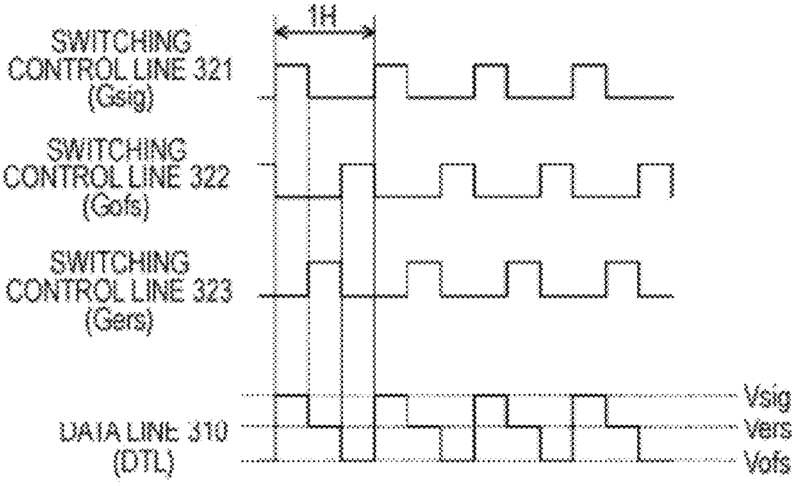

FIGS. 3A and 3B are diagrams showing an example of a method of generating data signals, which are supplied to the data lines (DTL) 311 to 313, by the horizontal selector (HSEL) 300 in the display apparatus 100. FIG. 3A is a block diagram showing an example of the configuration of the horizontal selector (HSEL) 300 constituting the display apparatus 100. FIG. 3B is a timing chart showing changes in potential of switching control line 321 to 323 and the data line (DTL) 310 in the configuration shown in FIG. 3A.

In FIG. 3A, video signal lines 301 to 303, a reference signal line 391, an extinction signal line 392, switching control lines 321 to 323, switching circuits 351 to 353, switching circuits 361 to 363, and switching circuits 371 to 373 are shown.

A video signal (Vsig) for the respective pixels 600 of each row is supplied to the video signal lines 301 to 303 in a time division manner. A reference signal (Vofs) for correction of the threshold voltage of a drive transistor constituting the pixel 600 (threshold correction) is supplied to the reference signal line 391. An extinction signal (Vers) for extinguishing the pixel 600 is supplied to the extinction signal line 392. A switching control signal (Gsig) for controlling switching of the switching circuits 351 to 353 is supplied to the switching control line 321. A switching control signal (Gofs) for controlling switching of the switching circuits 361 to 363 is supplied to the switching control line 322. A switching control signal (Gers) for controlling switching of the switching circuits 371 to 373 is supplied to the switching control line 323.

The switching circuits 351 to 353 respectively switch connection and disconnection between the video signal lines 301 to 303 and the data lines (DTL) 311 to 313 on the basis of the switching control signal (Gsig) from the switching control line 321. The switching circuits 361 to 363 respectively switch connection and disconnection between the reference signal line 391 and the data lines (DTL) 311 to 313 on the basis of the switching control signal (Gofs) from the switching control line 322. The switching circuits 371 to 373 respectively switch connection and disconnection between the extinction signal line 392 and the data lines (DTL) 311 to 313 on the basis of the switching control signal (Gers) from the switching control line 323.

FIG. 3B shows changes in potential of the switching control lines 321 to 323 and the data line (DTL) 310 with the horizontal axis as a common time axis. Although the potential (Vsig) of the video signal changes depending on a video signal input to the display apparatus 100, in this embodiment, it is assumed that the video signal is at fixed potential. Here, the operation of the horizontal selector (HSEL) 300 during one horizontal scanning period (1H) will be described.

First, immediately before a previous horizontal scanning period ends, the potential of the switching control signal (Gsig) in the switching control line 321 is set at L level, and the potential of the switching control signal (Gofs) in the switching control line 322 is set at H level. The potential of the switching control signal (Gers) in the switching control line 323 is set at L level.

Next, during one horizontal scanning period, the potential of the switching control signal (Gsig) in the switching control line 321 is changed from L level to H level, and the potential of the switching control signal (Gofs) in the switching control line 322 is changed from H level to L level. Thus, the video signal lines 301 to 303 and the data lines (DTL) 311 to 313 are respectively connected to each other by the switching circuits 351 to 353, such that the video signal (Vsig) is supplied to the data line (DTL) 310 as a data signal.

Next, the potential of the switching control signal (Gsig) in the switching control line 321 is changed from H level to L level, and the potential of the switching control signal (Gers) in the switching control line 323 is changed from L level to H level. Thus, the extinction signal line 392 and the data lines (DTL) 311 to 313 are connected to each other by the switching circuits 371 to 373, such that the extinction signal (Vers) is supplied to the data line (DTL) 310 as a data signal.

Next, the potential of the switching control signal (Gers) in the switching control line 323 is changed from H level to L level, and the potential of the switching control signal (Gofs) in the switching control line 322 is changed from L level to H level. Thus, the reference signal line 391 and the data lines (DTL) 311 to 313 are connected to each other by the switching circuits 361 to 363, such that the reference signal (Vofs) is supplied to the data line (DTL) 310 as a data signal.

As described above, a three-value data signal can be generated by using the three switching circuits and the three switching control lines 321 to 323 for every data line (DTL) 310.

[Example of Basic Operation of Display Apparatus]

Figure 4:
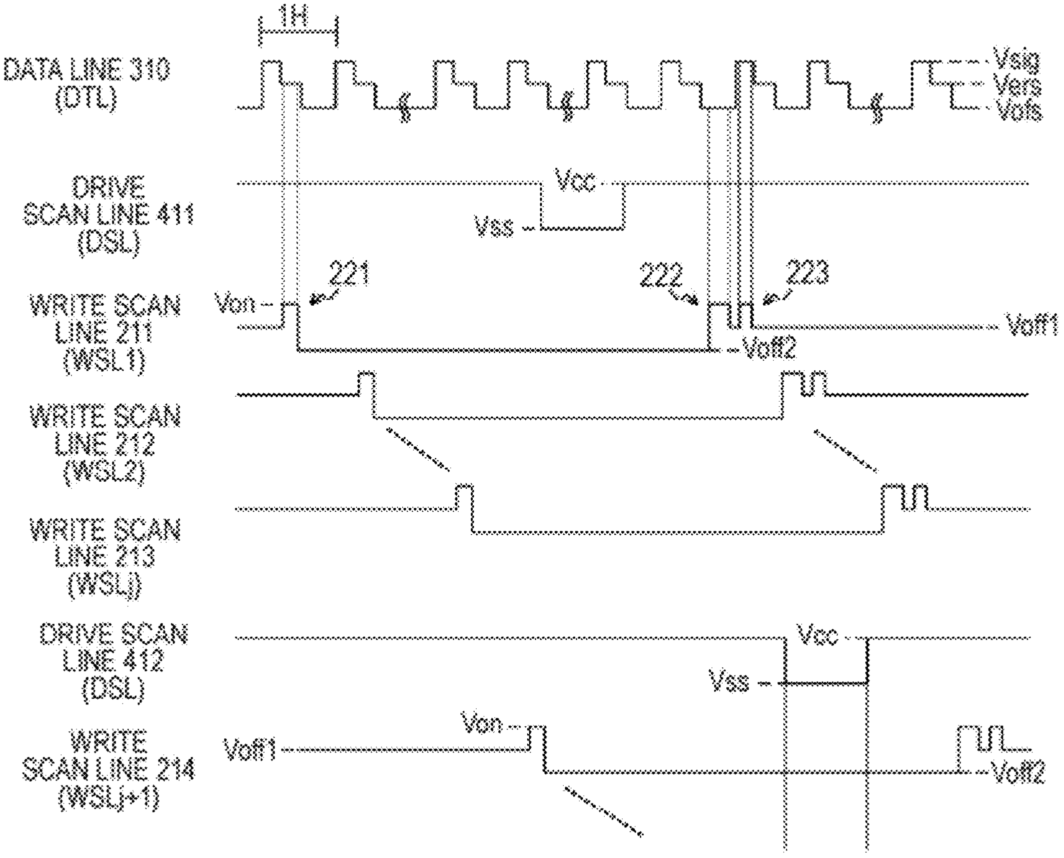
FIG. 4 is a timing chart regarding an example of a basic operation of the display apparatus.

FIG. 4 is a timing chart regarding an example of the basis operation of the display apparatus 100. Here, changes in potential of the drive scan lines (DSL) 411 and 412, the data line (DTL) 310, and the write scan lines (WSL) 211 to 214 are shown with the horizontal axis as a common time axis.

As shown in FIG. 3B, changes in potential of the data line (DTL) 310 are changes in potential of a data signal generated by the horizontal selector (HSEL) 300. As shown in FIG. 2B, changes in potential of the drive scan lines (DSL) 411 and 412 are changes in potential of power supply signals generated by the drivers 401 and 402 in the drive scanner (DSCN) 400.

Changes in potential of the write scan lines (WSL) 211 to 214 are changes in potential of control signals generated by the drivers 201 to 204 in the write scanner (WSCN) 200. As described above, any one of the on potential (Von), the first off potential (Voff1), and the second off potential (Voff2) is supplied to the write scan lines (WSL) 211 to 214 as a control signal. Thus, three pulses 221 to 223 are respectively supplied to the write scan lines (WSL) 211 to 214.

The first pulse 221 is a pulse which gives the potential (Vers) of the extinction signal for extinguishing the pixel 600 to the pixel 600. The second pulse 222 is a pulse which gives the potential (Vofs) of the reference signal for threshold correction to the pixel 600. The third pulse 223 is a pulse for performing mobility correction with respect to a drive transistor constituting the pixel 600 and writing the video signal (Vsig). The respective pulses are supplied to the write scan line (WSL2) 212 after 1H (horizontal scanning period) with respect to the write scan line (WSL1) 211. Though not shown, the respective pulses are supplied to a write scan line next to the write scan line (WSL2) 212 after 1H with respect to the write scan line (WSL2) 212.

In this case, the power supply signal of the drive scan line (DSL) 411 is applied simultaneously to the pixels 600 connected to the write scan lines (WSL) 211 to 213, and the power supply signal of the drive scan line (DSLj+1) 412 is applied to the pixels 600 connected to the write scan line (WSL) 214.

[Example of Configuration of Pixel]

Figure 5:
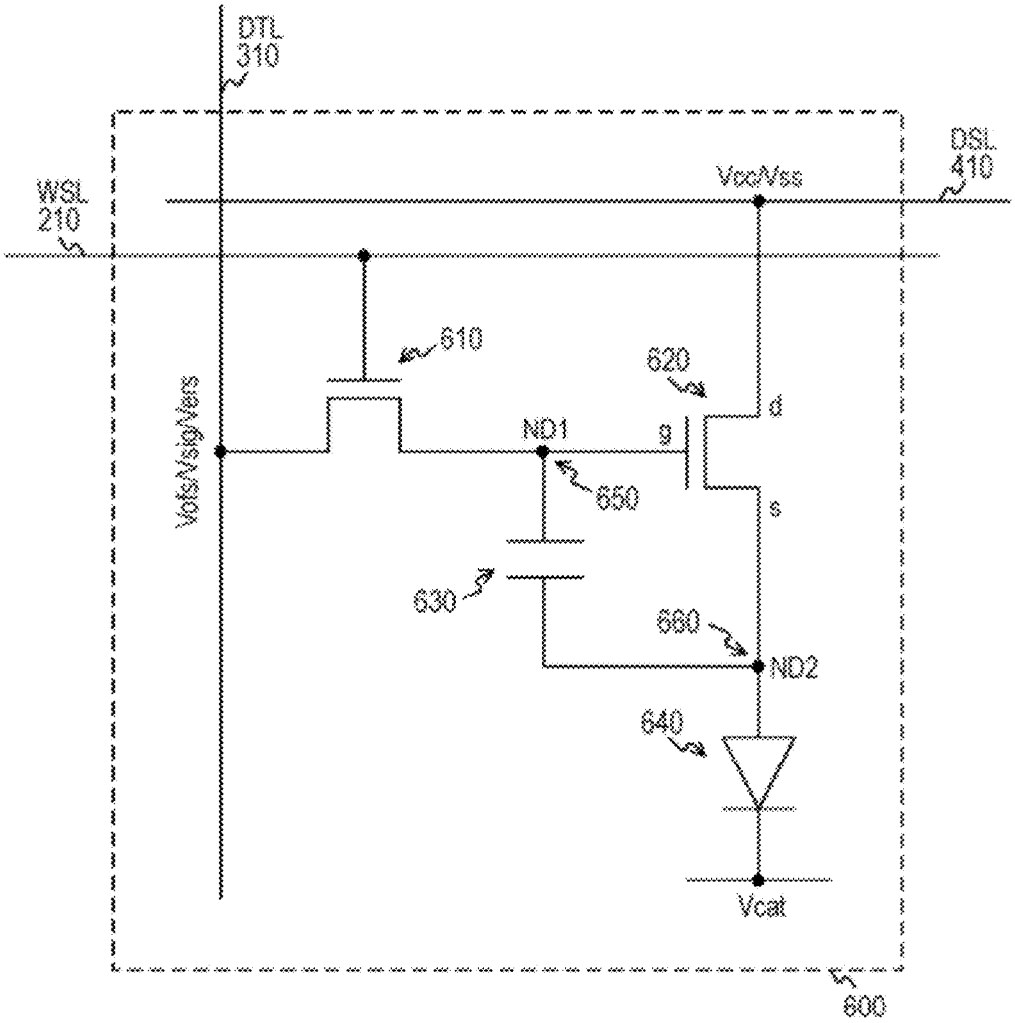
FIG. 5 is a circuit diagram schematically showing an example of the configuration of a pixel in the display apparatus.

FIG. 5 is a circuit diagram schematically showing an example of the configuration of the pixel 600 in the display apparatus 100. The pixel 600 is a pixel circuit which includes a write transistor 610, a drive transistor 620, a storage capacitor 630, and a light-emitting device 640. The pixels 600 are an example of a plurality of pixel circuits described in the appended claims. Here, it is assumed that the write transistor 610 and the drive transistor 620 are n-channel transistors.

The gate terminal and the drain terminal of the write transistor 610 are respectively connected to the write scan line (WSL) 210 and the data line (DTL) 310. The source terminal of the write transistor 610 is connected to one electrode of the storage capacitor 630 and the gate terminal (g) of the drive transistor 620. Here, it is assumed that the connection point is a first node (ND1) 650. The drain terminal (d) of the drive transistor 620 is connected to the drive scan line (DSL) 410, and the source terminal (s) of the drive transistor 620 is connected to the other electrode of the storage capacitor 630 and the input terminal of the light-emitting device 640. Here, it is assumed that the connection point is a second node (ND2) 660.

The write transistor 610 writes a data signal from the data line (DTL) 310 to the storage capacitor 630 in accordance with a control signal of the write scan line (WSL) 210. The write transistor 610 gives the potential of the data signal to one electrode of the storage capacitor 630 so as to apply a voltage for causing the light-emitting device 640 to emit light to the storage capacitor 630.

The write transistor 610 writes a voltage corresponding to the video signal to the storage capacitor 630 after causing the storage capacitor 630 to retain a threshold voltage on the basis of the potential (Vofs) of the reference signal by threshold correction. The write transistor 610 also gives the potential (Vers) of the extinction signal to one electrode of the storage capacitor 630. That is, the write transistor 610 gives the potential (Vers) of the extinction signal to the gate terminal of the drive transistor 620 so as to stop the supply of a drive current for causing the light-emitting device 640 to emit light. The write transistor 610 is an example of a write transistor described in the appended claims.

The drive transistor 620 receives the power supply potential (Vcc) from the drive scan line (DSL) 410, and outputs a drive current according to a voltage based on the potential (Vsig) of the video signal written to the storage capacitor 630 to the light-emitting device 640. The drive transistor 620 also stops the supply of the drive current to the light-emitting device 640 by the potential (Vers) of the extinction signal given to the gate terminal thereof by the write transistor 610. The drive transistor 620 is an example of a drive transistor described in the appended claims.

The storage capacitor 630 retains a voltage corresponding to a data signal given by the write transistor 610. The storage capacitor 630 retains, for example, a voltage corresponding to a video signal written by the write transistor 610. The storage capacitor 630 is an example of a storage capacitor described in the appended claims.

The light-emitting device 640 emits light in accordance with the magnitude of a drive current supplied from the drive transistor 620. The light-emitting device 640 may be implemented by, for example, an organic EL device. The light-emitting device 640 is an example of a light-emitting device described in the appended claims.

Although in this embodiment, it is assumed that the write transistor 610 and the drive transistor 620 are n-channel transistors, the invention is not limited to this combination. The transistors may be of an enhancement type, a depletion type, a dual-gate type.

[Example of Basic Operation of Pixel]

Figure 6:
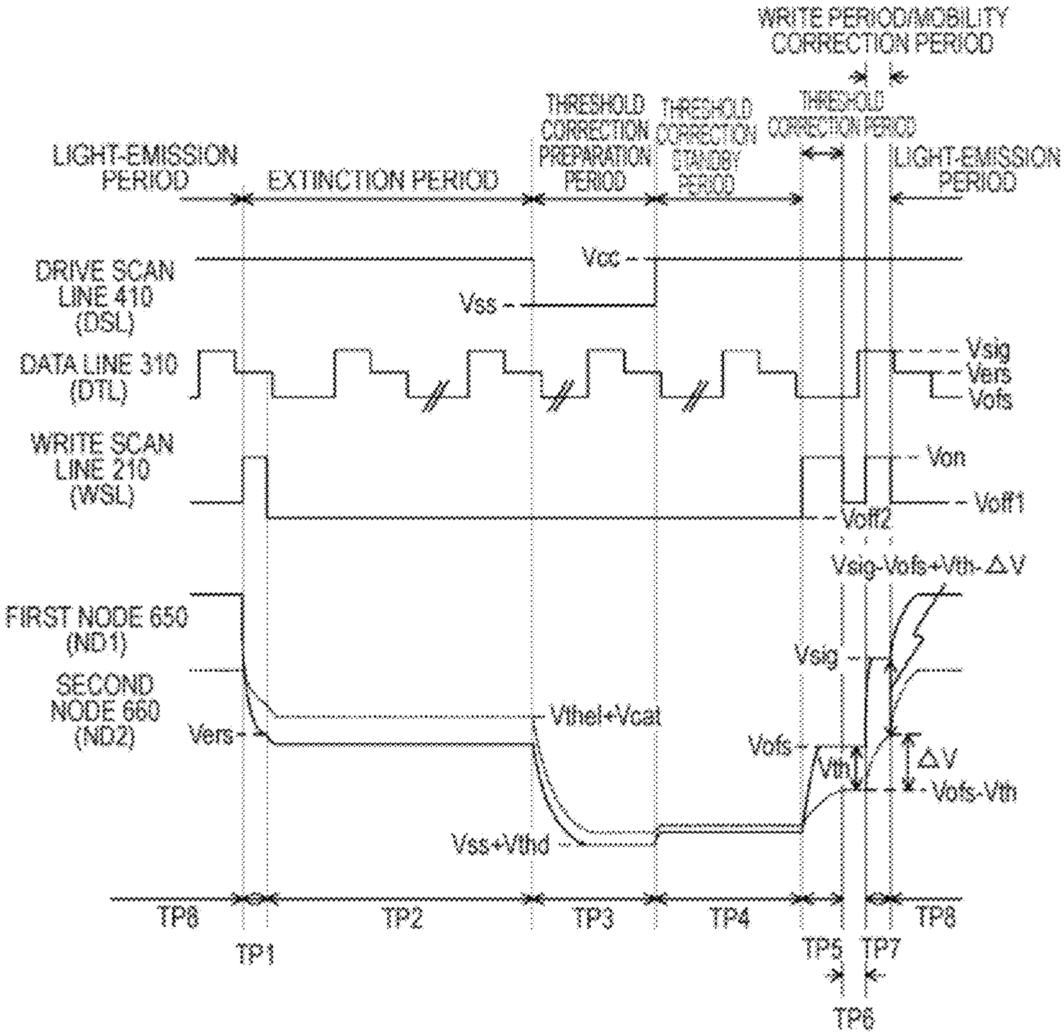
FIG. 6 is a timing chart regarding an example of a basic operation of the pixel in the display apparatus.

FIG. 6 is a timing chart regarding an example of the basic operation of the pixel 600 in the display apparatus 100. In this timing chart, changes in potential of the write scan line (WSL) 210, the data line (DTL) 310, the drive scan line (DSL) 410, the first node (ND1) 650, and the second node (ND2) 660 are shown with the horizontal axis as a common time axis. Here, changes in potential of the second node (ND2) 660 are indicated by a dotted line, and other changes in potential are indicated by a solid line. The length of the horizontal axis representing each period is schematic, and thus does not represent a rate of the time length of each period.

In this timing chart, for convenience, the change of the operation of the pixel 600 is divided into periods TP1 to TP8. During a light-emission period TP8, the light-emitting device 640 is in a light-emission state. Immediately before the light-emission period TP8 ends, the control signal of the write scan line (WSL) 210 is set at the first off potential (Voff1), and the data line (DTL) 310 is set at the potential (Vers) of the extinction signal. The power supply signal of the drive scan line (DSL) 410 is set at the power supply potential (Vcc).

Thereafter, a new field of line-sequential scanning is reached, and during an extinction period TP1, the control signal of the write scan line (WSL) 210 is switched from the first off potential (Voff1) to the on potential (Von). Thus, the potential at the first node (ND1) 650 decreases to the potential (Vers) of the extinction signal, and the potential at the second node (ND2) 660 also decreases due to coupling by the storage capacitor 630.

Next, during an extinction period TP2, the control signal of the write scan line (WSL) 210 is switched to the second off potential (Voff2). Thus, the potential at the second node (ND2) 660 decreases a threshold potential (Vthel+Vcat) of the light-emitting device 640, so the light-emitting device 640 is extinguished. At this time, the potential at the first node (ND1) 650 also decreases due to coupling by the storage capacitor 630. Vthel is the threshold voltage of the light-emitting device 640, and Vcat is a potential which is given to a cathode electrode constituting the light-emitting device 640.

During a threshold correction preparation period TP3, the potential at the first node (ND1) 650 decreases close to the initialization potential (Vss). In this case, if the control signal of the write scan line (WSL) 210 is set at the first off potential (Voff1), a current leaks from the write transistor 610 toward the first node (ND1) 650. For this reason, the second off potential (Voff2) of the control signal of the write scan line (WSL) 210 is set to be lower than the first off potential (Voff1) taking the potential at the first node (ND1) 650 during the threshold correction preparation period TP3 into consideration.

Next, during the threshold correction preparation period TP3, the power supply signal of the drive scan line (DSL) 410 is switched from the power supply potential (Vcc) to the initialization potential (Vss). Thus, a current flows in the drive transistor 620 toward the drain terminal, such that the potential at the first node (ND1) 650 decreases to "Vss+Vthd". At this time, the potential at the second node (ND2) 660 also decreases. That is, the pixel 600 is initialized. Vthd is a threshold voltage between the drain terminal and the gate terminal of the drive transistor 620. In this embodiment, Vthd refers to a threshold voltage on the drain terminal side.

Next, during a threshold correction standby period TP4, the power supply signal of the drive scan line (DSL) 410 is switched from the initialization potential (Vss) to the power supply potential (Vcc). Thus, a current flows in the drive transistor 620 toward the other electrode of the storage capacitor 630 on the source terminal side, such that the potentials at the first node (ND1) 650 and the second node (ND2) 660 increase.

Next, during a threshold correction period TP5, a threshold correction operation is performed. When the data signal of the data line (DTL) 310 is at the potential (Vofs) of the reference signal, the control signal of the write scan line (WSL) 210 is switched from the second off potential (Voff2) to the on potential (Von). Thus, a voltage corresponding to the threshold voltage (Vth) of the drive transistor 620 is applied between the first node (ND1) 650 and the second node (ND2) 660. Thereafter, during the period TP6, the control signal of the write scan line (WSL) 210 temporarily falls to the first off potential (Voff1), and the data signal of the data line (DTL) 310 is switched from the potential (Vofs) of the reference signal to the potential (Vsig) of the video signal.

Next, during a write period/mobility correction period TP7, the control signal of the write scan line (WSL) 210 rises to the on potential (Von), and the potential at the first node (ND1) 650 increases to the potential (Vsig) of the video signal. Thus, a current flows from the drive transistor 620 to parasitic capacitance 641 of the light-emitting device 640, and charging of the parasitic capacitance 641 starts. Meanwhile, the potential at the second node (ND2) 660 increases by an increased amount (ΔV) due to mobility correction. That is, the control signal of the write scan line (WSL) 210 is at the on potential (Von), such that the potential (Vsig) of the video signal is written to one electrode of the storage capacitor 630. Simultaneously, a potential ((Vofs−Vth)+ΔV) which increases from the potential (Vofs-Vth) applied during the period TP5 by the increased amount (ΔV) due to mobility correction is applied to the other electrode of the storage capacitor 630.

Thus, a voltage "Vsig−((Vofs−Vth)+ΔV)" is retained by the storage capacitor 630 as the voltage corresponding to the video signal.

Thereafter, during the light-emission period TP8, the control signal of the write scan line (WSL) 210 is set at the first off potential (Voff1). Thus, the light-emitting device 640 emits light with luminance according to the voltage (Vsig−Vofs+Vth−ΔV) retained by the storage capacitor 630. In this case, the voltage (Vsig−Vofs+Vth−ΔV) retained by the storage capacitor 630 is corrected by the threshold voltage (Vth) and the increased amount (ΔV) due to mobility correction. For this reason, variations in the threshold voltage (Vth) and mobility of the drive transistor 620 do not affect luminance of the light-emitting device 640. During a period halfway to the light-emission period TP8, the potentials at the first node (ND1) 650 and the second node (ND2) 660 increase. At this time, a potential difference (Vsig−Vofs+Vth−ΔV) between the first node (ND1) 650 and the second node (ND2) 660 is maintained.

Although an example where the threshold correction operation is performed once for single light-emission of the light-emitting device 640 has been described, the number of threshold correction operations is not limited thereto. The threshold correction operation may be performed twice or more.

[Details of Operation State of Pixel]

Next, the operation of the pixel 600 will be described in detail with reference to the drawings. The following drawings show the operation states of the pixel 600 corresponding to the periods TP1 to TP8 in the timing chart shown in FIG. 6. For convenience, the parasitic capacitance 641 of the light-emitting device 640 is shown. The write transistor 610 is shown as a switch, and the write scan line (WSL) 210 is omitted.

FIGS. 7A to 7C are circuit diagrams schematically showing the operation states of the pixel 600 corresponding to the periods TP8, TP1, and TP2. During the light-emission period TP8, as shown in FIG. 7A, the power supply signal of the drive scan line (DSL) 410 is set at the power supply potential (Vcc), and the drive transistor 620 supplies a drive current (Ids) to the light-emitting device 640.

Next, during the extinction period TP1, as shown in FIG. 7B, when the data signal of the data line (DTL) 310 is at the potential (Vers) of the extinction signal, the control signal of the write scan line (WSL) 210 is changed from the first off potential (Voff1) to the on potential (Von). Thus, the write transistor 610 is turned on (conduction state), such that the potential at the first node (ND1) 650 decreases to the potential (Vers) of the extinction signal. At this time, the potential at the second node (ND2) 660 also decreases due to coupling through the storage capacitor 630 caused by the decrease in potential of the first node (ND1) 650. Subsequently, during the extinction period TP2, as shown in FIG. 7C, the control signal of the write scan line (WSL) 210 is changed to the second off potential (Voff2), such that the write transistor 610 is turned off (non-conduction state). In this case, the potential at the second node (ND2) 660 decreases to the threshold potential (Vthel+Vcat) of the light-emitting device 640, such that the light-emitting device 640 is extinguished.

The potential at the first node (ND1) 650 also decreases so as to follow the decrease in potential of the second node (ND2) 660.

FIGS. 8A to 8C are circuit diagrams schematically showing the operation states of the pixel 600 corresponding to the periods TP3 to TP5.

During the threshold correction preparation period TP3 subsequent to the period TP2, as shown in FIG. 8A, the power supply signal of the drive scan line (DSL) 410 is switched from the power supply potential (Vcc) to the initialization potential (Vss). Thus, a current flows in the drive transistor 620 toward the drive scan line (DSL) 410, such that the potential at the second node (ND2) 660 decreases. Simultaneously, the first node (ND1) 650 is in a floating state, so the potential at the first node (ND1) 650 also decreases so as to follow the decrease in potential of the second node (ND2) 660. At this time, the potential at the first node (ND1) 650 decreases until the potential difference between the potential at the first node (ND1) 650 and the initialization potential (Vss) of the drive scan line (DSL) 410 becomes a voltage corresponding to the threshold voltage (Vthd) on the drain terminal side in the drive transistor 620. That is, the potential at the first node (ND1) 650 decreases to "Vss+Vthd". In this way, the pixel 600 is initialized.

Next, during the threshold correction standby period TP4, as shown in FIG. 8B, the power supply signal of the drive scan line (DSL) 410 is switched from the initialization potential (Vss) to the power supply potential (Vcc). Thus, a small amount of current flows in the drive transistor 620 toward the other electrode of the storage capacitor 630, such that the potentials at the first node (ND1) 650 and the second node (ND2) 660 increase.

Next, during the threshold correction period TP5, as shown in FIG. 8C, when the data signal of the data line (DTL) 310 is at the potential (Vofs) of the reference signal, the control signal of the write scan line (WSL) 210 is changed from the second off potential (Voff2) to the on potential (Von). Thus, the potential at the first node (ND1) 650 is set at the potential (Vofs) of the reference signal. Therefore, a current flows from the drive transistor 620 to the other electrode of the storage capacitor 630, such that the potential at the second node (ND2) 660 increases.

Next, the potential difference between the first node (ND1) 650 and the second node (ND2) 660 becomes a voltage corresponding to the threshold voltage (Vth) between the source terminal and the gate terminal of the drive transistor 620, and the current stops (cutoff state). Thus, the voltage corresponding to the threshold voltage (Vth) of the drive transistor 620 is retained in the storage capacitor 630 with respect to the potential (Vofs) of the reference signal. In this way, the threshold correction operation is completed. In this case, the potential (Vcat) at the cathode electrode is set such that no current from the drive transistor 620 flows in the light-emitting device 640.

FIGS. 9A to 9C are circuit diagrams schematically showing the operation states of the pixel 600 corresponding to the periods TP6 to TP8.

During the period TP6 subsequent to the period TP5, as shown in FIG. 9A, the control signal in the write scan line (WSL) 210 is changed from the on potential (Von) to the second off potential (Voff2), such that the write transistor 610 is turned off (non-conduction state). Thereafter, the data signal of the data line (DTL) 310 is switched from the potential (Vofs) of the reference signal to the potential (Vsig) of the video signal. In this case, in the data line (DTL) 310, the rising edge of the potential (Vsig) of the video signal becomes moderate by the write transistor 610 in each of a plurality of pixels 600 connected to the data line (DTL) 310. For this reason, the write transistor 610 is turned off until the data signal reaches the potential (Vsig) of the video signal taking the transient characteristics of the data line (DTL) 310 into consideration.

During the write period/mobility correction period TP7 subsequent to the period TP6, as shown in FIG. 9B, the control signal of the write scan line (WSL) 210 is changed to the on potential (Von), such that the write transistor 610 is turned on. Thus, the potential at the first node (ND1) 650 is set at the potential (Vsig) of the video signal. Simultaneously, a current flows from the drive transistor 620 to the other electrode of the storage capacitor 630, such that the potential at the second node (ND2) 660 increases by "ΔV". Then, the potential difference between the first node (ND1) 650 and the second node (ND2) 660 becomes "Vsig−Vofs+Vth−ΔV". In this way, writing of the potential (Vsig) of the video signal and adjustment of the increased amount (ΔV) due to mobility correction are performed.

During this operation, the larger the potential (Vsig) of the video signal is, the larger the current output from the drive transistor is, so the increased amount (ΔV) due to mobility correction increases. Therefore, mobility correction based on a luminance level (the potential of the video signal) can be performed. When the potential (Vsig) of the video signal for each pixel is fixed, as a drive transistor of a pixel has large mobility, the increased amount (ΔV) due to mobility correction increases. For example, in the case of a pixel where a drive transistor has large mobility, the amount of a current flowing toward the other electrode of the storage capacitor increases, as compared with a pixel having small mobility, so the gate-source voltage of the drive transistor decreases as much. Therefore, in the case of a pixel where a drive transistor has large mobility, the drive current which is supplied to the light-emitting device during the light-emission period is adjusted so as to have the same magnitude as a pixel having small mobility. In this way, variation in mobility of the drive transistor for each pixel is eliminated.

Next, during the light-emission period TP8, as shown in FIG. 9C, the control signal of the write scan line (WSL) 210 is changed to the first off potential (Voff1), such that the write transistor 610 is turned off. When this happens, the potential at the second node (ND2) 660 increases due to the drive current (Ids) from the drive transistor 620, and the potential at the first node (ND1) 650 also increases. At this time, the potential difference (Vsig−Vofs+Vth−ΔV) between the first node (ND1) 650 and the second node (ND2) 660 is maintained by a bootstrap operation.

As described above, after a voltage corresponding to the threshold voltage (Vth) is retained by the storage capacitor 630 through the threshold correction operation, the increased amount (ΔV) due to the mobility correction operation is applied to the other electrode of the storage capacitor 630. Therefore, variations in the threshold voltage and mobility of the drive transistor 620 for each pixel 600 are cancelled, and as a result, irregularity or the like in the display image can be suppressed.

In such a display apparatus 100, it is assumed that the potential at the second node (ND2) 660 does not sufficiently decrease during the extinction period TP1 due to the parasitic capacitance 641 of the light-emitting device 640 and parasitic capacitance of the drive transistor 620. The operation of the pixel 600 when the potential at the second node (ND2) 660 does not sufficiently decrease during the extinction period TP1 will now be described with reference to the drawings.

[Example where Decrease in Potential of Second Node During Extinction Period is Moderate]

Figure 10:
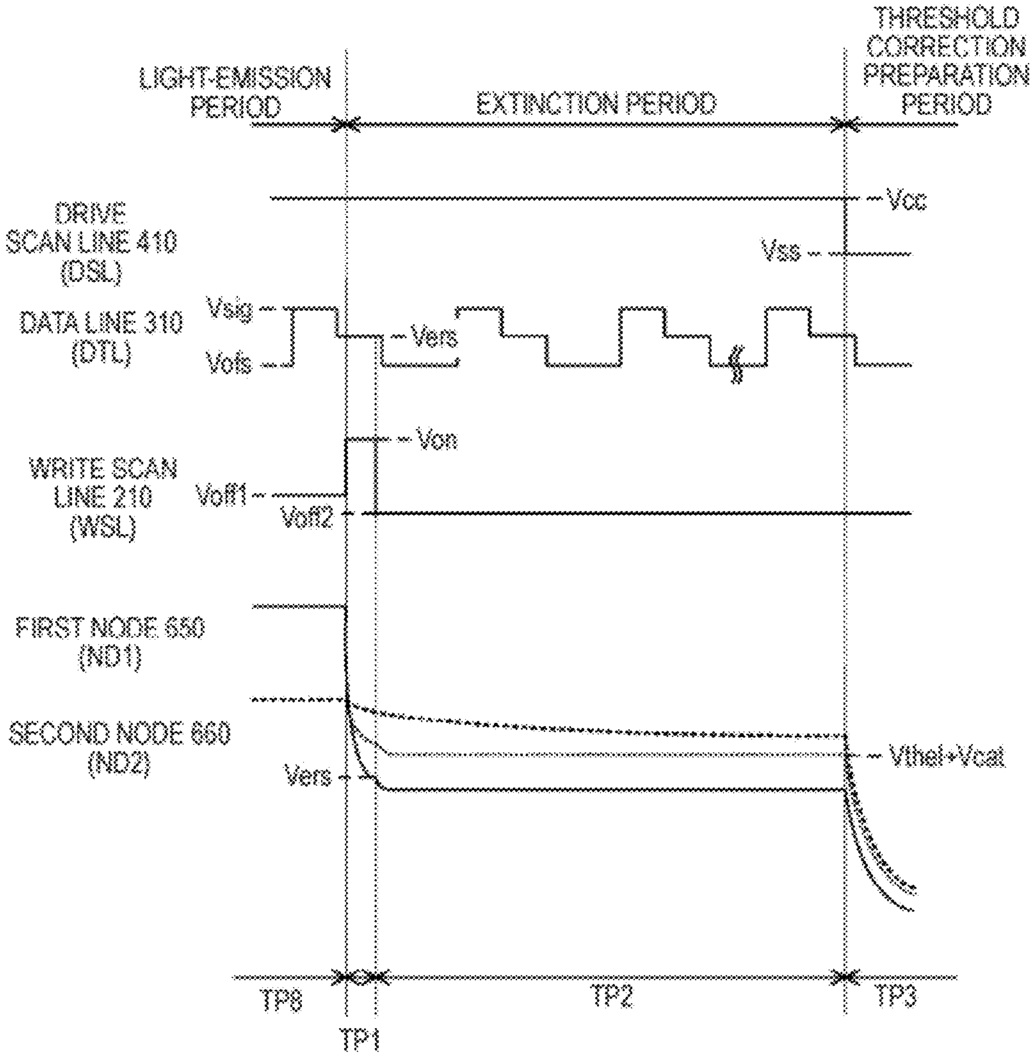
FIG. 10 is a timing chart illustrating an operation of the pixel when the potential at a second node (ND2) moderately decreases during an extinction period TP1 in the display apparatus.

FIG. 10 is a timing chart showing the operation of the pixel 600 when the potential at the second node (ND2) 660 moderately decreases during the extinction period TP1 in the display apparatus 100. Changes in potential other than changes in potential of the second node (ND2) 660 represented by a bold dotted line are the same as shown in FIG. 6. Changes in potential of the second node (ND2) 660 represented by a fine dotted line are changes in potential of the second node (ND2) 660 shown in FIG. 6.

In this embodiment, description will be provided focusing on changes in potential of the second node (ND2) 660 represented by the bold dotted line. During the extinction period TP1, the potential at the second node (ND2) 660 decreases due to coupling from the storage capacitor 630 so as to follow the decrease in potential of the first node (ND1) 650. In this case, the potential at the second node (ND2) 660 does not decrease rapidly but decreases moderately by the effect of the parasitic capacitance 641 of the light-emitting device 640 or the like. During the extinction period TP2, the potential at the second node (ND2) 660 is decreasing gradually mainly due to discharging of the storage capacitor 630, and the extinction period TP2 is changed to the threshold correction preparation period TP3 before the threshold voltage (Vthel+Vcat) of the light-emitting device 640 is reached.

At this time, the potential at the second node (ND2) 660 is higher than the threshold potential (Vthel+Vcat) of the light-emitting device 640, so a current continues to flow in the light-emitting device 640. For this reason, during the extinction period TP2, the luminance gradually decreases, but the light-emitting device 640 continues to emit light.

Thereafter, during the threshold correction preparation period TP3, the power supply signal of the drive scan line (DSL) 410 is switched from the power supply potential (Vcc) to the initialization potential (Vss), such that the potential at the second node (ND2) 660 is higher than the threshold potential (Vthel+Vcat) of the light-emitting device 640. Thus, the light-emitting device 640 is completely extinguished.

As described above, when the potential at the second node (ND2) 660 moderately decreases during the extinction period TP1, the light-emitting device 640 continues to emit light immediately before the threshold correction preparation period TP3. In such a display apparatus 100, the power supply signals are switched simultaneously in terms of plural number of rows (groups). Accordingly, as shown in FIG. 3, since the extinction period TP2 differs for every row of pixels 600, the period in which the light-emitting device 640 emits light differs for every row of pixels 600.

Figures 11A, 11B:
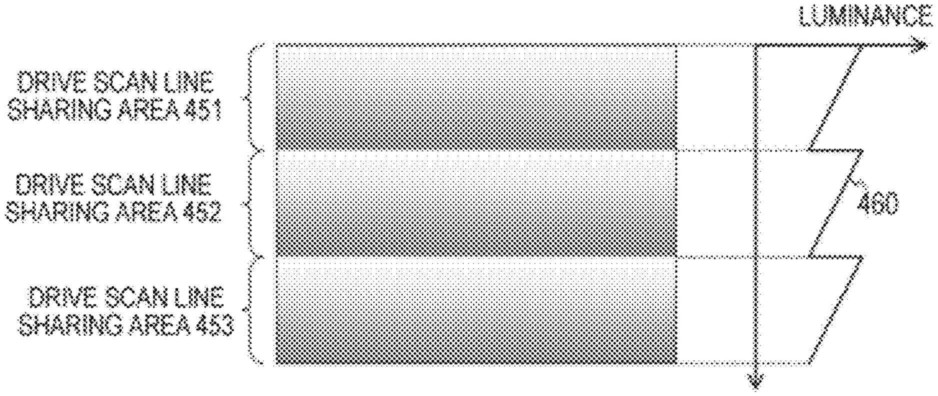
FIGS. 11A to 11C are diagrams regarding a display image which is displayed on the display apparatus when the potential at the second node (ND2) moderately decreases during the extinction period TP1 in the display apparatus.
Figure 11C:
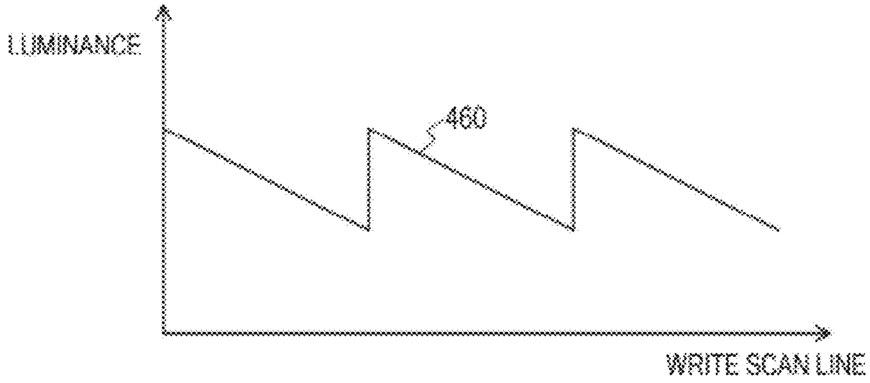

FIGS. 11A to 11C are diagrams regarding a display image which is displayed on the display apparatus 100 when the potential at the second node (ND2) 660 moderately decreases during the extinction period TP1 in the display apparatus 100. FIG. 11A is a diagram showing an example of a display image which is displayed on the display apparatus 100. FIG. 11B is a diagram showing a relationship between luminance characteristic in a column direction with respect to a display image and the display image shown in FIG. 11A. FIG. 11C shows the graph of luminance characteristic shown in FIG. 11B on a magnified scale after rotating by 90 degrees. Here, it is assumed that an input image input to the display apparatus 100 is entirely a gray color image.

FIG. 11A shows drive scan line sharing areas 451 to 453. The drive scan line sharing areas 451 to 453 represent areas displayed by the pixels 600 to which the same power supply signal is supplied. The drive scan line sharing areas 451 to 453 are gradually darkened sequentially from the upper row. The darkest color in the drive scan line sharing areas 451 to 453 becomes the color of the input image.

FIG. 11B is a graph showing luminance characteristic 460. In the graph of luminance characteristic of FIG. 11B, the vertical axis represents a horizontal line (write scan line) of a display image, and the horizontal axis represents a luminance value. The luminance characteristic 460 is luminance characteristic representing the luminance value corresponding to the horizontal line of the display image shown in FIG. 11A.

FIG. 11C shows the graph of luminance characteristic 460 of FIG. 11B on a magnified scale after rotating by 90 degrees in a clockwise direction. That is, in the graph of luminance characteristic of FIG. 11C, the horizontal axis represents a write scan line, and the vertical axis represents a luminance value. FIGS. 11B and 11C are graphs schematically showing the luminance characteristic of the display image shown in FIG. 11A. Details of the luminance characteristic will be described with reference to FIG. 18A.

As described above, when the potential at the second node (ND2) 660 does not sufficiently decrease during the extinction period TP1, gradation occurs in the display image due to light-emission of the pixels 600 during the extinction period TP2 which differs for every row. That is, since the amount of light emission from the light-emitting devices 640 of each row of pixels 600 differs during the extinction period TP2, gradation occurs in the display image. A first embodiment of the invention described below relates to an improvement for reducing gradation in the display image.

[Example of Configuration of Driver of Drive Scanner]

Figure 12A:
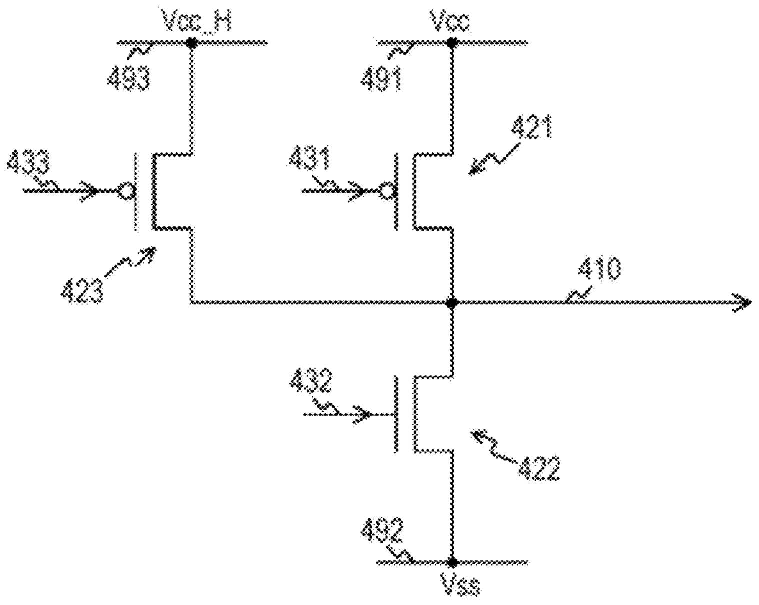
FIGS. 12A and 12B are diagrams showing an example of a method of generating a power supply signal, which is supplied to a drive scan line (DSL), by drivers in a drive scanner (DSCN) according to a first embodiment of the invention.
Figure 12B:
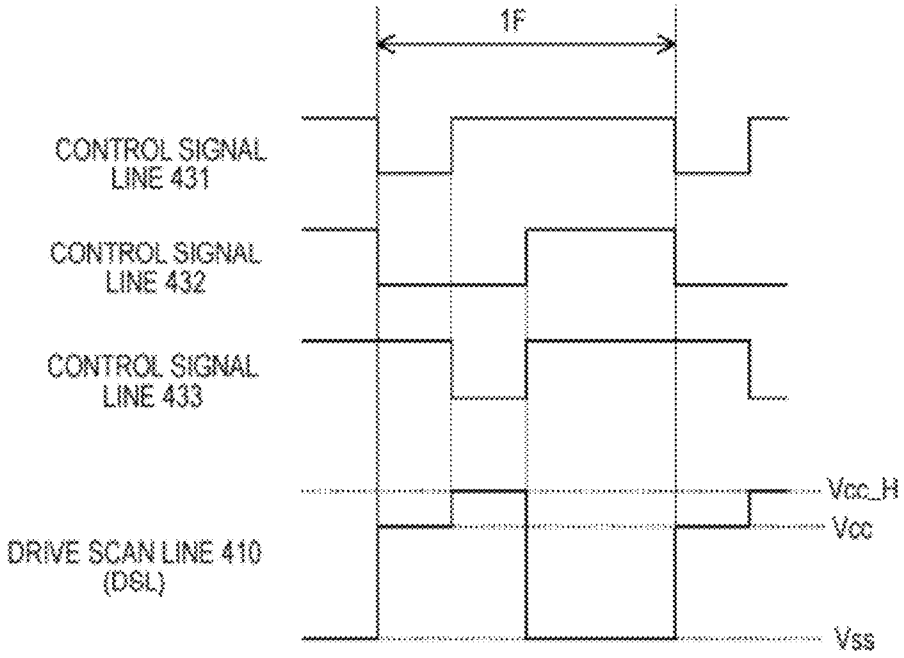

FIGS. 12A and 12B are diagrams showing an example of a method of generating a power supply signal, which is supplied to the drive scan line (DSL) 410, by the drivers 401 to 403 in the drive scanner (DSCN) 400 according to a first embodiment of the invention.

FIG. 12A is an equivalent circuit diagram showing an example of the configuration of the driver 401 in the drive scanner (DSCN) 400 according to the first embodiment of the invention. Parts other than the p-type transistor 423, the control signal line 432, the control signal line 433, and the fixed potential line 493 are the same as those shown in FIG. 2A. Therefore, the same parts are represented by the same reference numerals, and description thereof will not be repeated.

In this configuration, the p-type transistor 423 has a gate terminal connected to the control signal line 433, and a source terminal connected to the fixed potential line 493. The drain terminal of the p-type transistor 423 is connected to the drain terminal of the p-type transistor 421, the drain terminal of the n-type transistor 422, and the drive scan line (DSL) 410. The gate terminal of the n-type transistor 422 is connected to a control signal line 432, instead of the control signal line 431 shown in FIG. 2A.

A control signal for switching power supply signals in the drive scan line (DSL) 410 is supplied to the control signal lines 431 to 433. A high-level power supply potential (Vcc_H) higher than the potential of the fixed potential line 491 is supplied to the fixed potential line 493.

FIG. 12B shows changes in potential of the control signal lines 431 to 433 and the drive scan line (DSL) 410 with the horizontal axis as a common time axis. Here, the operation of the driver 401 during one field period (1F) will be described.

First, immediately after a previous field period ends, the potential of the control signal in each of the control signal lines 431 to 433 is set at H level. During one field period, the potential of the control signal in each of the control signal lines 431 and 432 is changed to L level. For this reason, the p-type transistor 421 is turned on (conduction state) and the n-type transistor 422 is turned off (non-conduction state). At this time, the p-type transistor 423 is maintained turned off (non-conduction state). Thus, the power supply potential (Vcc) of the fixed potential line 491 is supplied to the drive scan line (DSL) 410 as the power supply signal.

Next, the potential of the control signal in the control signal line 431 is switched from L level to H level, and the potential of the control signal in the control signal line 433 is switched from H level to L level. At this time, the p-type transistor 421 is turned off (non-conduction state) and the p-type transistor 423 is turned on (conduction state). Thus, the high-level power supply potential (Vcc_H) of the fixed potential line 493 is supplied to the drive scan line (DSL) 410 as the power supply signal.

Thereafter, the potential of the control signal in the control signal line 433 is switched from L level to H level, and the potential of the control signal in the control signal line 432 is switched from L level to H level. At this time, the p-type transistor 423 is turned off (non-conduction state) and the n-type transistor 422 is turned on (conduction state). Thus, the initialization potential (Vss) of the fixed potential line 492 is supplied to the drive scan line (DSL) 410 as the power supply signal.

As described above, with the p-type transistor 423 in each of the drivers 401 to 403 of the drive scanner (DSCN) 400, the power supply signal can be switched from the power supply potential (Vcc) to the high-level power supply potential (Vcc_H). The drivers 401 to 403 of the drive scanner (DSCN) 400 are an example of a power supply circuit described in the appended claims.

[Example of Operation of Pixel]

Figure 13:
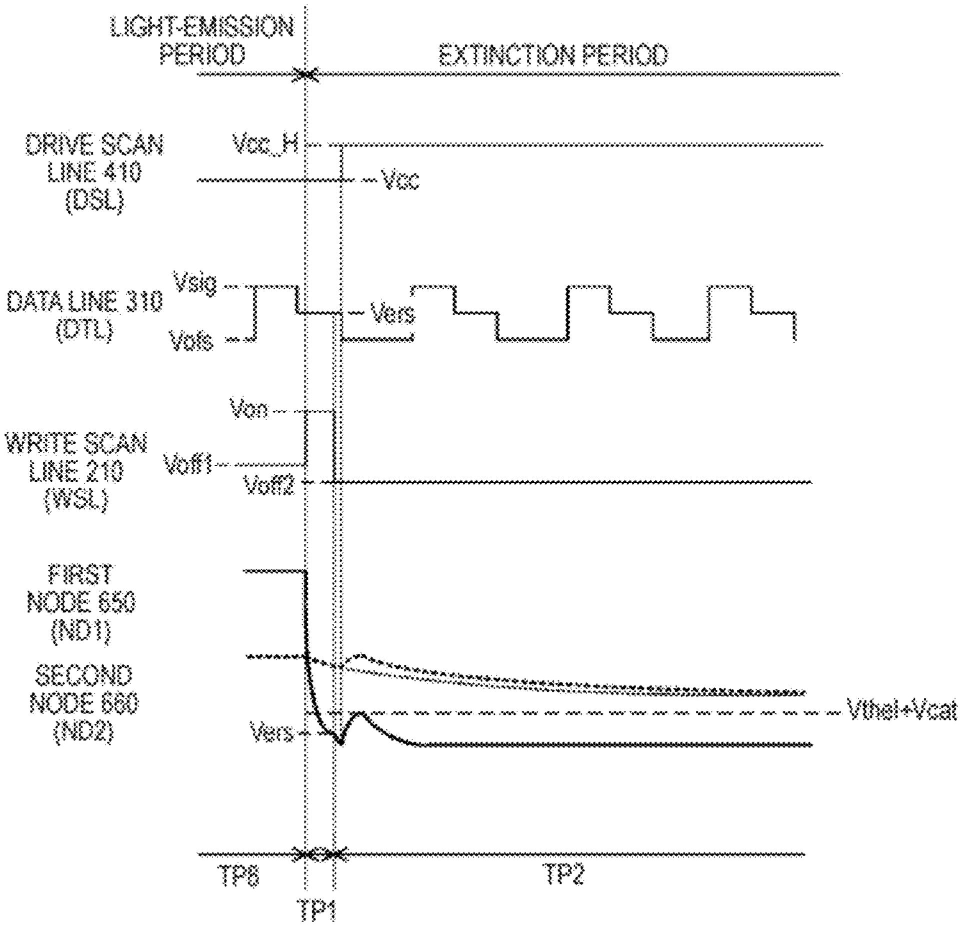
FIG. 13 is a timing chart regarding an example of an operation of the pixel according to the first embodiment of the invention.

FIG. 13 is a timing chart regarding an example of the operation of the pixel 600 according to the first embodiment of the invention. Changes in potential other than changes in potential of the drive scan line (DSL) 410, the first node (ND1) 650, and the second node (ND2) 660 are the same as those shown in FIG. 10. Changes in potential of the second node (ND2) 660 represented by a fine dotted line are changes in potential of the second node (ND2) 660 represented by a bold dotted line in FIG. 10.

Here, description will be given focusing changes in potential of the second node (ND2) 660 represented by the bold dotted line. During the extinction period TP1, the control signal of the write scan line (WSL) 210 is switched from the first off potential (Voff1) to the on potential (Von). When this happens, the potential (Vers) of the extinction signal is given to the gate terminal of the drive transistor 620 by the write transistor 610, such that the potential at the first node (ND1) 650 decreases to the potential (Vers) of the extinction signal. At this time, the potential at the second node (ND2) 660 slightly decreases.

Thereafter, during the extinction period TP2, the control signal of the write scan line (WSL) 210 is switched to the second off potential (Vff2). Then, the power supply signal of the drive scan line (DSL) 410 is switched from the power supply potential (Vcc) to the high-level power supply potential (Vcc_H). When this happens, the potential of the drive scan line (DSL) 410 rises rapidly, so the potential at the first node (ND1) 650 increases due to coupling by parasitic capacitance between the drain terminal and the gate terminal of the drive transistor 620. Accordingly, the potential at the second node (ND2) 660 also increases mainly due to coupling from the storage capacitor 630. Thereafter, the potential at the second node (ND2) 660 is gradually decreasing.

As described above, during the extinction period TP2, the power supply signal of the drive scan line (DSL) 410 is switched from the power supply potential (Vcc) to the high-level power supply potential (Vcc_H), so the potential at the second node (ND2) 660 can temporarily increase. For this reason, a current which is supplied to the light-emitting device 640 increases. Therefore, the luminance of the light-emitting device 640 increases, such that the amount of light emission from the light-emitting device 640 during the extinction period can be increased. Although in this embodiment, the power supply signal is switched to the high-level power supply potential (Vcc_H) when a predetermined time of period has elapsed after the control signal is switched to the second off potential (Voff2) taking switching accuracy of the power supply signal into consideration, the power supply signal may be switched to the high-level power supply potential (Vcc_H) simultaneously with switching of the second off potential (Voff2). Next, the effect of the increase in potential of the second node (ND2) 660 during the extinction period TP2 on gradation in the display image will be described below with reference to the drawings.

[Example of Changes in Potential of Second Nodes in Uppermost and Lowermost Rows During Extinction Period]

Figure 14:
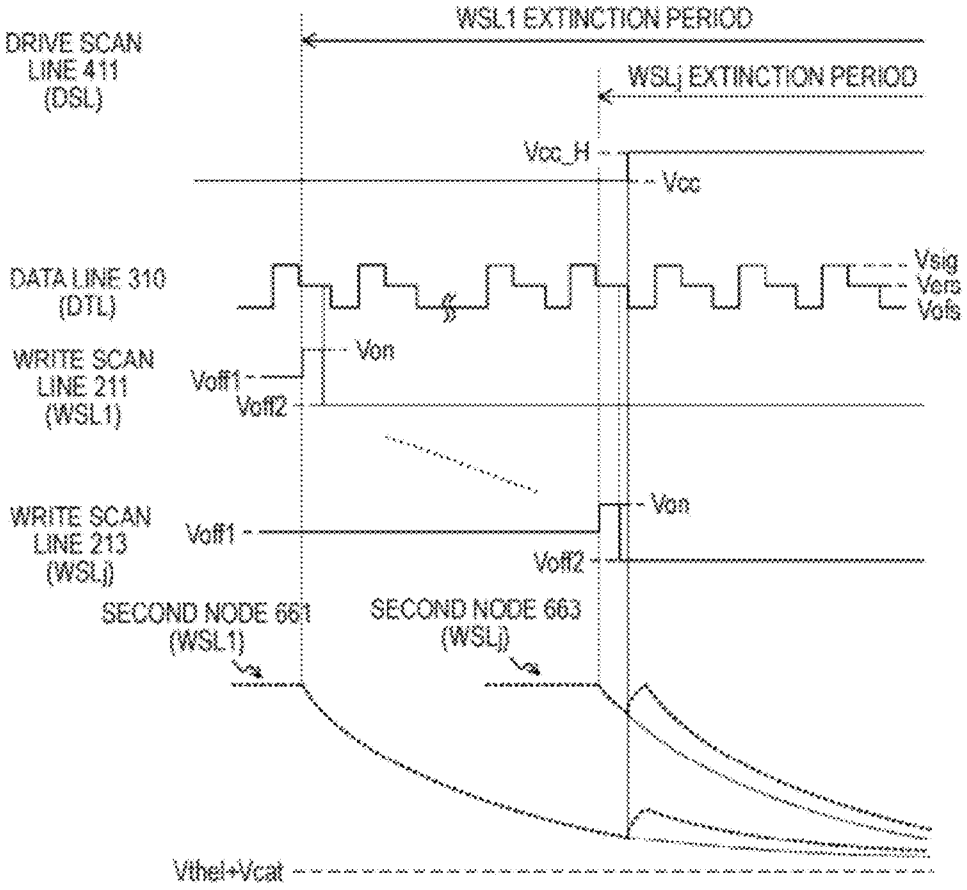
FIG. 14 is a timing chart showing changes in potential at the second node (ND2) between an uppermost pixel and a lowermost pixel from among the pixels sharing a drive scan line in the display apparatus according to the first embodiment of the invention.

FIG. 14 is a timing chart showing changes in potential of the second node (ND2) 660 in the pixels 600 sharing the drive scan line in the display apparatus 100 according to the first embodiment of the invention. This timing chart is an example of a timing chart which shows changes in potential of the second node (ND2) 660 in the uppermost and lowermost pixels 600 from among the pixels 600 sharing the drive scan line (the pixels 600 belonging to the same group) in the display apparatus 100. Here, it is assumed that, after the extinction period TP2 starts in the lowermost pixel 600, the power supply signal of the drive scan line (DSL) 411 is switched to the high-level power supply potential (Vcc_H).

Here, with the horizontal axis as a common time axis, changes in potential of the drive scan line (DSL) 411, the data line (DTL) 310, the write scan line (WSL1) 211, and the write scan line (WSLj) 213 are represented by solid lines, and changes in potential of the second nodes 661 and 663 are represented by bold dotted lines. Further, changes in potential of the second nodes (WSL1 and WSLj) 661 and 663 when the power supply signal of the drive scan line (DSL) 411 is not switched to the high-level power supply potential (Vcc_H) are represented by fine dotted lines. Changes in potential of the data line (DSL) 310 are the same as those shown in FIG. 13.

The write scan line (WSL1) 211 is a write scan line which is connected to the uppermost first row of pixels 600 from among the pixels 600 connected to the drive scan line (DSL) 411. In the pixels 600 connected to the write scan line (WSL1) 211, the extinction period is represented as a WSL1 extinction period. That is, the WSL1 extinction period is an extinction period for extinguishing the pixels 600 connected to the write scan line (WSL1) 211 from among the pixels 600 to which the same power supply signal is supplied. The write scan line (WSLj) 213 is a write scan line which is connected to the lowermost j-th row of pixels 600 from among the pixels 600 connected to the drive scan line (DSL) 411. In the pixels 600 connected to the write scan line (WSLj) 213, the extinction period is represented as a WSLj extinction period. A period from when the WSL1 extinction period starts until the WSLj extinction period ends (WSL) is an example of an extinction period for extinguishing a light-emitting device described in the appended claims.

In this embodiment, description will be made focusing on changes in potential of the second node (WSL1) 661 and the second node (WSLj) 663 in the pixels 600 respectively connected to the write scan line (WSL1) 211 and the write scan line (WSLj) 213.

During the WSL1 extinction period, first, the control signal of the write scan line (WSL1) 211 is temporarily changed to the on potential (Von). When this happens, as shown in FIG. 10, the potential at the second node (WSL1) 661 is gradually decreasing due to discharging of the storage capacitor 630 or the like.

Thereafter, simultaneously with the start of the WSLj extinction period, the control signal of the write scan line (WSLj) 213 is temporarily changed to the on potential (Von), such that the potential at the second node (WSLj) 663 moderately decreases. Then, after the control signal of the write scan line (WSLj) 213 is switched to the second off potential (Voff2), the power supply signal of the drive scan line (DSL) 411 is switched from the power supply potential (Vcc) to the high-level power supply potential (Vcc_H). That is, the high-level power supply potential (Vcc_H) is supplied by the drive scanner (DSCN) 400 after the extinction potential (Vers) is given to the gate terminal of the drive transistor in each of the last row of pixels from among a plurality of rows of pixels connected to one drive scan line.

At this time, the potentials at the second node (WSL1) 661 and the second node (WSLj) 663 increase to the same extent due to coupling caused by a rapid increase in potential of the drive scan line (DSL) 411. That is, the power supply signal is switched to the high-level power supply potential (Vcc_H), such that the potential at the second node (ND2) 660 in all of the pixels 600 connected to the drive scan line (DSL) 411 increases. Therefore, the potential difference from the threshold potential (Vthel+Vcat) of the light-emitting device 640 increases, and a current supplied to the light-emitting device 640 increases, so the luminance of the light-emitting device 640 increases. Then, the potentials at the second node (WSL1) 661 and the second node (WSLj) 663 are moderately decreasing, and become equal to or lower than the threshold potential (Vthel+Vcat) of the light-emitting device 640 during the threshold correction preparation period TP3.

In this case, the potentials at the second node (WSL1) 661 and the second node (WSLj) 663 are gradually approximating to the potentials represented by the fine dotted lines. The potential difference between the potential represented by the bold dotted line and the potential represented by the fine dotted line at the second node (WSL1) 661 is gradually decreasing lower than the potential difference at the second node (WSLj) 663. Therefore, the amount of light emission from the light-emitting device 640 increases at the second node (WSL1) 661 and the second node (WSLj) 663 which are generated given that the extinction period differs for every row. Here, the effect of the increase in the amount of light emission from the light-emitting device 640 at the second node (WSL1) 661 and the second node (WSLj) 663 will be described with reference to a simulation result shown in a subsequent drawing.

Figures 15A, 15B:
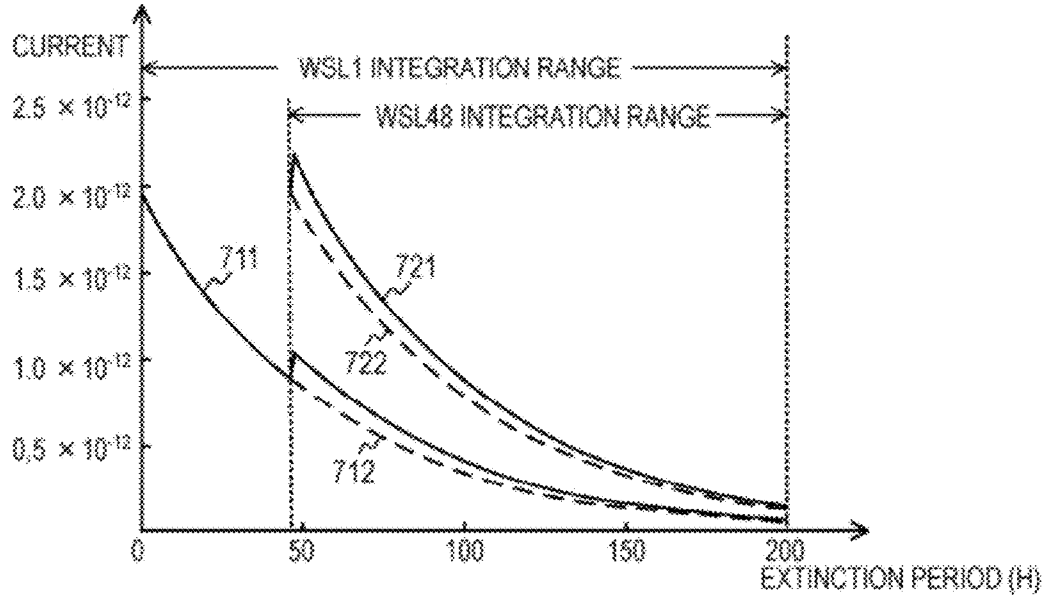
FIGS. 15A and 15B are diagrams regarding the amount of light-emission from a light-emitting device at a second node (WSL1) and a second node (WSLj) according to the first embodiment of the invention.

FIGS. 15A and 15B are diagrams regarding the amount of light emission from the light-emitting device 640 at the second node (WSL1) 661 and the second node (WSLj) 663 according to the first embodiment of the invention. FIG. 15A is a diagram showing an example of a calculation result of characteristics regarding a current supplied to the light-emitting device 640 at the second node (WSL1) 661 and the second node (WSLj) 663 during the extinction period TP2 on the basis of an RC module. In this embodiment, the lowermost (j) row of pixels 600 sharing the drive scan line (DSL) 411 is the 48-th row. It is assumed that, in the 48-th row of pixels 600, immediately after the extinction period TP2 starts, the power supply signal of the drive scan line (DSL) 411 is switched to the high-level power supply potential (Vcc_H).

Here, current characteristics 711 and 721 are represented by solid lines, and current characteristics 712 and 722 are represented by broken lines. The horizontal axis represents an extinction period, and the vertical axis represents a current value supplied to the light-emitting device 640.

The current characteristics 711 and 721 represented by the solid lines are current characteristics when the power supply signal of the drive scan line (DSL) 411 is switched to the high-level power supply potential (Vcc_H) so as to increase the potentials at the second nodes (WSL1 and WSL48) 661 and 663. The current characteristics 712 and 722 represented by the broken lines are current characteristics at the second node (WSL1 and WSL48) 661 and 663 when the power supply signal of the drive scan line (DSL) 411 is not switched to the high-level power supply potential (Vcc_H).

FIG. 15B is a diagram showing a comparison result of a ratio regarding the integration values of the current characteristics 711 and 721 shown in FIG. 15A and a ratio regarding the integration values of the current characteristics 712 and 722.

The first row of integration value 731 represents the integration values of the current characteristics 711 and 712 in a WSL1 integration range of FIG. 15A. The 48-th row of integration value 732 represents the integration values of the current characteristics 721 and 722 in a WSL48 integration range of FIG. 15A. The first and 48-th rows of integration values 731 and 732 correspond to the amount of light emission from the light-emitting device 640 during the extinction period at the second node (WSL1 and WSL48) 661 and 663.

An integration ratio 733 represents a value calculated by dividing a value, which is obtained by subtracting the 48-th row of integration value 732 from the first row of integration value 731, by the first row of integration value 731. As the value of the integration ratio 733 is small, gradation in the display image is moderated.

The column, No high-level power supply potential (Vcc_H switching), of the current characteristic 740 shows the integration values of the current characteristics 712 and 722 shown in FIG. 15A. The column, high-level power supply potential (Vcc_H switching), of the current characteristic 740 shows the integration values of the current characteristics 711 and 721 shown in FIG. 15A.

As described above, as the first row of integration value 731 and the 48-th row of integration value 732 increase, the integration ratio 733 decreases from "2.2%" to "1.26". This is because, while the difference between the first and 48-th rows of integration values 731 and 732 serving as the numerator of a difference ratio 733 remains almost unchanged, the first row of integration value 731 serving as the denominator of the difference ratio 733 increases. Since the difference ratio 733 decreases, gradation in the display image is moderated. That is, the amount of current supplied to the light-emitting device 640 corresponding to each of the second nodes (WSL1 and WSL48) 661 and 663 during the extinction period TP2 in the 48-th row of pixels 600 increases, so gradation in the display image can be reduced.

As described above, in the first embodiment of the invention, the power supply signal of the drive scan line (DSL) 411 is switched to the high-level power supply potential (Vcc_H) during the WSLj extinction period, so the potentials at the second nodes (WSL1 and WSLj) 661 and 663 can be increased. That is, the power supply signal is switched to the high-level power supply potential (Vcc_H) during the WSLj extinction period, so the potential at the second node (ND2) 660 in plural number of rows of pixels 600 connected to the drive scan line (DSL) 411 can be temporarily increased.

Therefore, the amount of light emission from the light-emitting device 640 in plural number of rows of pixels 600 connected to one drive scan line can be increased, so gradation in the display image can be reduced. The power supply signal is preferably switched to the high-level power supply potential (Vcc_H) immediately after the extinction period TP2 in the write scan line (WSLj) 213 starts. This is because, as the potential at the second node (WSLj) 663 is high at the time of coupling, the increased amount of the amount of light emission from the light-emitting device 640 at the second nodes (WSL1 to WSLj) 661 to 663 increases.

As described above, according to the first embodiment of the invention, even when the same power supply signal is supplied for every plural number of rows of pixels, the power supply signal is switched to the high-level power supply potential (Vcc_H) during the extinction period, such that gradation in the display image can be reduced. Therefore, reproducibility of an input image can be maintained, and the number of drivers in the drive scanner (DSCN) 400 can be reduced with reduced cost.

In the first embodiment of the invention, it is assumed that the power supply signal of the drive scan line (DSL) 411 is switched to the high-level power supply potential (Vcc_H) after the extinction period TP2 in the lowermost pixel 600 starts, thereby reducing gradation. However, the timing for switching the power supply signals is not limited thereto, and the power supply signals may be switched at different timing, thereby further reducing gradation. Therefore, in a second embodiment of the invention, an example where rapid change in luminance with respect to gradation is reduced will be described with reference to FIGS. 16 to 18C.

<2. Second Embodiment>

[Example of Operation of Pixel]

Figure 16:
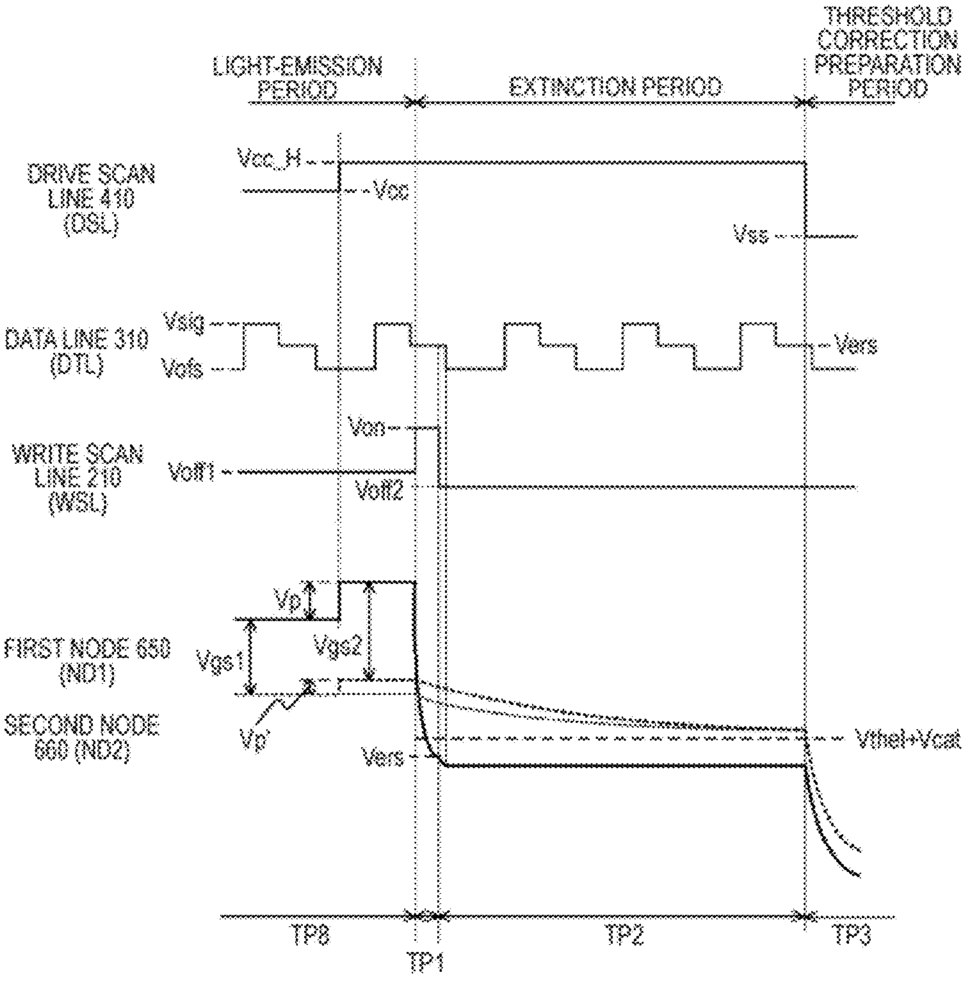
FIG. 16 is a timing chart regarding an example of an operation of a pixel according to a second embodiment of the invention.

FIG. 16 is a timing chart regarding an example of an operation of a pixel 600 according to a second embodiment of the invention. In this embodiment, an example of the operation of the pixel 600 will be described in which the power supply signal is set at the high-level power supply potential (Vcc_H) between the light-emission periods. Here, changes in potential of the drive scan line (DSL) 410, the data line (DTL) 310, the write scan line (WSL) 210, the first node (ND1) 650, and the second node (ND2) 660 are shown with the horizontal axis as a common time axis. Changes in potential other than changes in potential of the drive scan line (DSL) 410, the first node (ND1) 650, and the second node (ND2) 660 are substantially the same as those shown in FIG. 13, and thus description will not be repeated. Changes in potential of the second node (ND2) 660 represented by a fine dotted line are changes in potential of the second node (ND2) 660 represented by the bold dotted line in FIG. 10. Changes in potential of the second node (ND2) 660 represented by a bold dotted line are changes in potential of the second node (ND2) 660 according to the second embodiment of the invention.

In FIG. 16, description will be provided focusing on the drive current (not shown) supplied to the pixel 600 and changes in potential of the second node (ND2) 660. First, during the light-emission period TP8, the potential of the power supply signal of the drive scan line (DSL) 410 is switched to the high-level power supply potential (Vcc_H). The increase in potential of the power supply signal causes an increase in potential of the drain terminal of the drive transistor 620, and the amount of the drive current (Ids) increases due to the early effect. The term "early effect" refers to the effect due to the characteristics of a transistor that, in the case of a transistor which is operating within a saturation region, if a drain-source voltage (Vds) changes, the drive current (Ids) also changes. The increased drive current (Ids) is supplied to the light-emitting device 640, so luminance during the light-emission period TP8 increases.

Similarly to the extinction period TP2 of FIG. 13, the potential at the first node (ND1) 650 increases by "Vp" due to capacitive coupling through parasitic capacitance between the gate terminal (g) and the drain terminal (d) of the drive transistor 620 so as to follow the increase in potential of the power supply signal. With the increase in potential of the first node (ND1) 650, the potential at the second node (ND2) 660 also increases due to coupling through the storage capacitor 630. Meanwhile, the increased amount of the potential at the second node (ND2) 660 becomes a potential difference "Vp'" lower than the increased amount "Vp" of the potential at the first node (ND1) 650 due to the effect of the parasitic capacitance 641 of the light-emitting device 640 or the like. Thus, a voltage "Vgs2" higher than the retained voltage "Vgs1 (Vsig−Vofs+Vth−ΔV)" is retained by the storage capacitor 630 due to the bootstrap operation described with reference to FIG. 9C. When this happens, the amount of the drive current (Ids) supplied to the light-emitting device 640 increases.

As described above, the increased state of luminance of the pixel 600 is maintained until the extinction period TP1 starts due to the increase in the amount of the drive current (Ids) caused by the effect of the early effect and the increase in the voltage retained by the storage capacitor 630.

Thereafter, the control signal of the write scan line (WSL) 210 is switched from the first off potential (Voff1) to the on potential (Von), such that the extinction period TP1 starts. After the extinction period TP1, changes in potential are the same as those shown in FIG. 10, and thus description thereof will not be repeated.

As described above, the potential of the drive scan line (DSL) 410 is switched from the power supply potential (Vcc) to the high-level power supply potential (Vcc_H) during the light-emission period TP8, so luminance during the light-emission period TP8 can be increased.

[Example of Supply Timing of High-Level Power Supply Potential]

Figure 17:
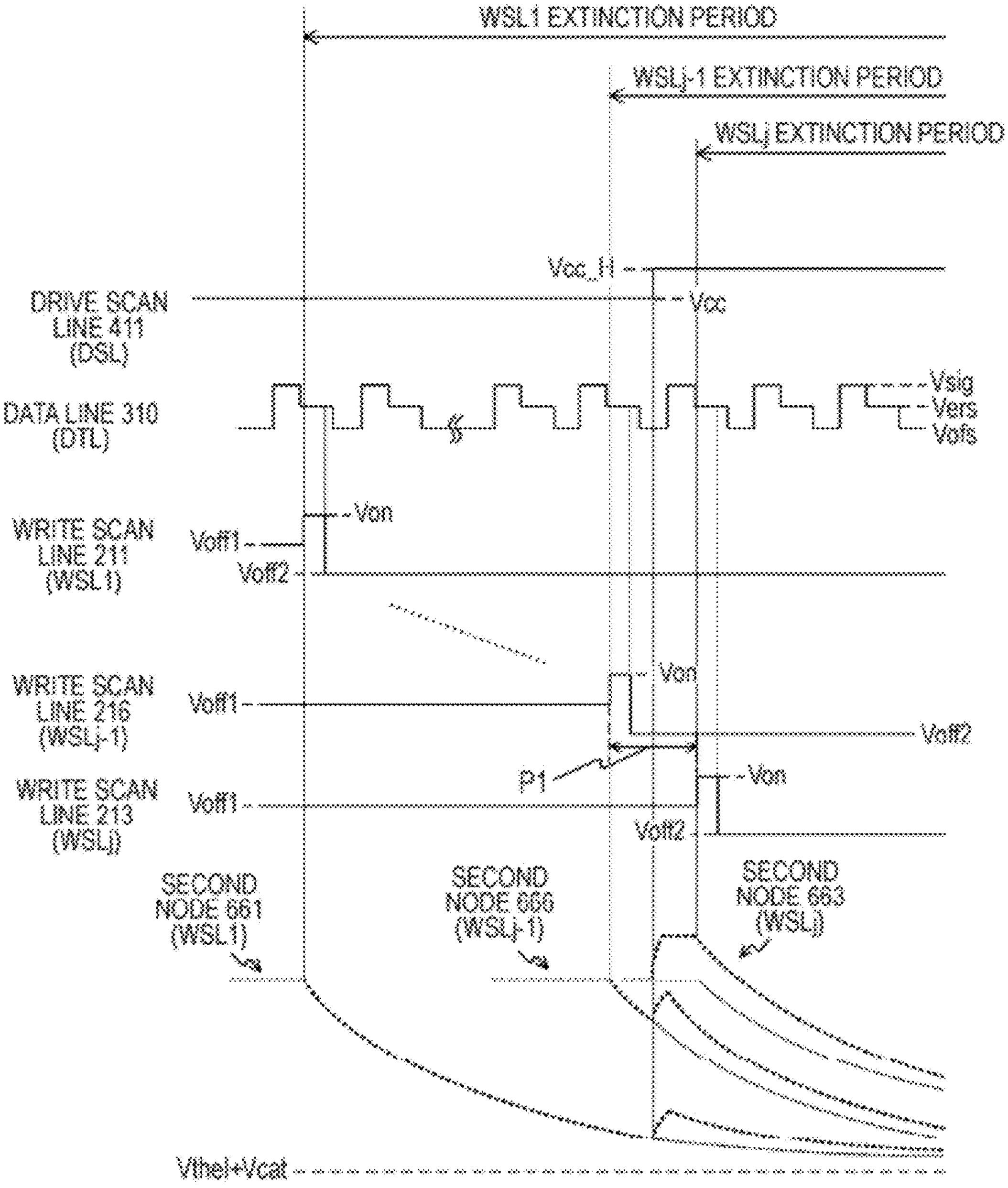
FIG. 17 is a timing chart regarding an example of supply timing of a high-level power supply potential (Vcc_H) according to the second embodiment of the invention.

FIG. 17 is a timing chart regarding an example of supply timing of the high-level power supply potential (Vcc_H) according to the second embodiment of the invention.

Here, changes in potential of the drive scan line (DSL) 411, the data line (DTL) 310, the write scan line (WSL1) 211, the write scan line (WSLj−1) 216, and the write scan line (WSLj) 213 are shown with the horizontal axis as a common time axis. With regard to the second node (WSL1) 661, the second node (WSLj−1) 666, and the second node (WSLj) 663, in the second embodiment of the invention, changes in potential are represented by bold dotted lines. Further, changes in potential of the second node (WSL1) 661, the second node (WSLj−1) 666, and the second node (WSLj) 663 when the power supply signal of the drive scan line (DSL) 411 is not switched to the high-level power supply potential (Vcc_H) are represented by fine dotted lines.

Changes in potential of the data line (DSL) 310 are the same as those shown in FIG. 13, and thus description thereof will not be repeated. Further, changes in potential of the write scan line (WSL1) 211 and the write scan line (WSLj) 213 are the same as those shown in FIG. 14, and thus description thereof will not be repeated.

A write scan line (WSLj−1) 216 is a previous write scan line of the lowermost write scan line (WSLj) 213 from among the write scan lines (WSL1 to WSLj) sharing the drive scan line. The extinction period in each of the pixels 600 connected to the write scan line (WSLj−1) 216 is represented as a WSLj−1 extinction period. Changes in potential of the second node (ND2) 650 during the extinction period in each of the pixels 600 connected to the write scan line (WSLj−1) 216 are represented as a second node (WSLj−1) 666.

In FIG. 17, description will be provided focusing on the timing at which the potential of the power supply signal of the drive scan line (DSL) 411 is switched to the high-level power supply potential (Vcc_H). First, during the WSL1 extinction period, the control signal of the write scan line (WSL1) 211 is temporarily changed to the on potential (Von). When this happens, as described with reference to FIG. 10, the potential at the second node (WSL1) 661 is gradually decreasing due to discharging of the storage capacitor 630 or the like. Thereafter, simultaneously with the start of the WSLj−1 extinction period, the control signal of the write scan line (WSLj−1) 216 is temporarily changed to the on potential (Von), such that the potential at the second node (WSLj−1) 666 moderately decreases.

Before the control signal of the write scan line (WSLj) 213 is switched to the on potential (Von), the power supply signal of the drive scan line (DSL) 411 is switched from the power supply potential (Vcc) to the high-level power supply potential (Vcc_H). The period in which the power supply signal is switched to the high-level power supply potential (Vcc_H) is a period which is represented as a period P1 in FIG. 17. That is, in the second embodiment of the invention, during a period (period P1) from the start of supply of the on potential (Von) in the write scan line (WSLj−1) 216 until the start of supply of the on potential (Von) in the write scan line (WSLj) 213, the potential of the power supply signal is switched.

At this time, each pixel 600 to which the write scan line (WSLj) 213 is connected is in the light-emission state during the light-emission period TP8. For reason, during a period from when the start of supply of the high-level power supply potential (Vcc_H) until the start of the WSLj extinction period, each pixel 600 to which the write scan line (WSLj) 213 is connected has luminance larger than luminance during the light-emission period before supply of the high-level power supply potential (Vcc_H). Thus, the luminance of each pixel 600 to which the write scan line (WSLj) 213 is connected increases during the light-emission period. During the period P1, as the change timing to the high-level power supply potential (Vcc_H) approximates to the start of supply of the on potential (Von) of the write scan line (WSLj−1) 216, the luminance of each pixel 600 to which the write scan line (WSLj) 213 is connected increases significantly.

When the potential of the power supply signal is switched to the high-level power supply potential (Vcc_H), the pixels 600 to which the write scan line (WSL1) 211 to the write scan line (WSLj−1) 216 are connected are already in the extinction period. For this reason, with regard to these pixels 600, as shown in FIG. 13, the potential at the second node (ND2) increases, so the luminance of the light-emitting device 640 during the extinction period increases.

Thereafter, the control signal of the write scan line (WSLj) 213 is temporarily changed to the on potential (Von). When this happens, as described with reference to FIG. 10, the potential at the second node (WSLj) 663 is gradually decreasing due to discharging of the storage capacitor 630 or the like. The potential at the second node (WSLj) 663 further increases than before the potential of the power supply signal is switched to the high-level power supply potential (Vcc_H). For this reason, the luminance of the light-emitting device 640 during the extinction period of each of the pixels 600 to which the write scan line (WSLj) 213 is connected further increases than a case where the potential of the power supply signal is not switched to the high-level power supply potential (Vcc_H).

As described above, during the period P1, the potential of the drive scan line (DSL) 411 is changed to the high-level power supply potential (Vcc_H), such that luminance can be increased during the light-emission period in each of the pixels 600 to which the lowermost write scan line from among the write scan lines sharing the drive scan line are connected. In this case, in the pixels 600 to which the write scan lines (WSL1 to WSLj) sharing the drive scan line are connected, similarly to the first embodiment of the invention, luminance during the extinction period can be increased. That is, in the second embodiment of the invention, the increased amount of luminance of each of the pixels 600 to which the write scan line (WSLj) 213 is connected can become larger than the increased amount of luminance in each of the pixels 600 to which other write scan lines (WSL1 to WSLj−1) are connected.

[Example of Luminance Displayed on Display Screen]

Figure 18A:
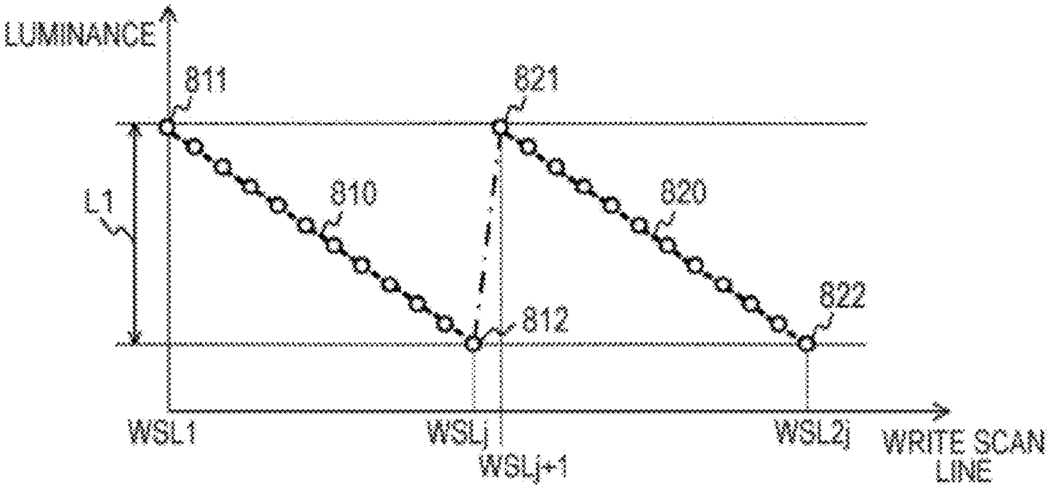
FIGS. 18A to 18C are diagrams showing an example of a relationship between luminance of a display image displayed on a display screen and a write scan line according to the second embodiment of the invention.
Figure 18B:
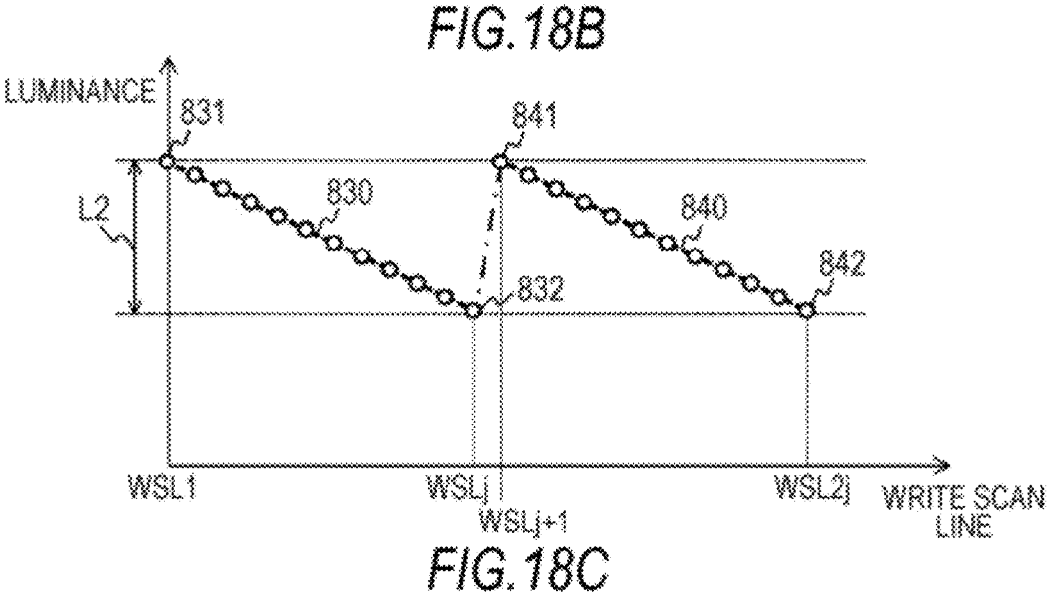
Figure 18C:
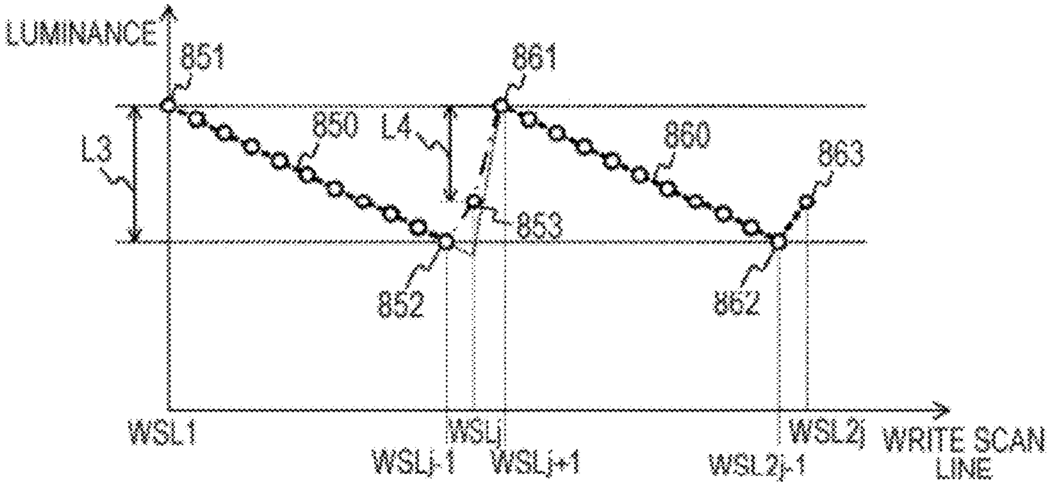

FIGS. 18A to 18C are diagrams showing an example of a relationship between luminance displayed on the display screen and the write scan line according to the second embodiment of the invention. FIGS. 18A to 18C are graphs of luminance characteristics with the horizontal axis representing a write scan line and the vertical axis representing a luminance value (the total amount of luminance during the light-emission period TP8 and the extinction periods TP1 and TP2). That is, the graphs shown in FIGS. 18A to 18C are graphs corresponding to the graphs in FIGS. 11B and 11C. For convenience, it is assumed that all of the video signals supplied to the pixels 600 have the same grayscale value.

FIG. 18A shows luminance characteristic in the display apparatus 100 when no high-level power supply potential (Vcc_H) is supplied, similarly to FIG. 11C.

A luminance value 811 corresponding to the write scan line (WSL1) is a luminance value of each pixel 600 to which the write scan line (WSL1) is connected. Luminance values 812, 821, and 822 are respectively luminance values in the pixels 600 to which the write scan line (WSLj), the write scan line (WSLj+1), and the write scan line (WSL2*j*) are connected. Respective white circles (white circles arranged on a dotted line 810) representing the luminance values from the luminance value 811 to the luminance value 812 are luminance values in the pixels 600 to which the write scan lines from the write scan line (WSL1) to the write scan line (WSLj) are connected. Respective white circles (white circles arranged on a dotted line 820) representing the luminance values from the luminance value 821 to the luminance value 822 are luminance values in the pixels 600 to which the write scan lines from the write scan line (WSLj+1) to the write scan line (WSL2*j*) are connected. It is assumed that the pixels 600 to which the write scan lines from the write scan line (WSL1) to the write scan line (WSLj) are connected and the pixels 600 to which the write scan lines from the write scan line (WSLj+1) to the write scan line (WSL2*j*) are connected share different drive scan lines. That is, it is assumed that the pixels 600 to which the write scan lines from the write scan line (WSL1) to the write scan line (WSLj) are connected are pixels 600 and the pixels 600 to which the write scan lines from the write scan line (WSLj+1) to the write scan line (WSL2*j*) belong to different groups. On the graphs shown in FIGS. 18A to 18C, for convenience of description, the write scan line (WSL1 to WSL2*j*) and the luminance values are simplified but do not represent the values in the actual display apparatus 100.

It is assumed that L1 represents a difference between the luminance value of the pixel 600 having the maximum luminance and the luminance value of the pixel 600 having the minimum luminance in the display apparatus 100 in which no high-level power supply potential (Vcc_H) is supplied. In FIG. 18A, the luminance value of the pixel 600 having the maximum luminance is the uppermost write scan line (luminance values 811 and 821) from among the write scan lines sharing the drive scan line. The luminance value of the pixel 600 having the minimum luminance is the lowermost write scan line (luminance values 812 and 822) from among the write scan lines sharing the drive scan line.

As described above, the drive scan line is shared, so gradation occurs in which luminance by the uppermost write scan line from among the write scan lines sharing the drive scan line has a maximum value, and luminance by the lowermost write scan line has a minimum value. In this case, at the boundary of the write scan lines sharing the drive scan line (the boundary of the luminance value 812 and the luminance value 821), the luminance value changes by the difference L1 between the maximum luminance value and the minimum luminance value. This change is the boundary of gradation and rapid change in luminance, so the change is likely to be viewed by a user.

FIG. 18B shows luminance values according to the first embodiment of the invention. Similarly to the luminance value 811 in FIG. 18A, a luminance value 831 is luminance by the pixel 600 to which the write scan line (WSL1) is connected. Luminance values 832, 841, and 842 are respectively the same as the luminance values 812, 821, and 822, and detailed description thereof will not be repeated. Here, description will be provided focusing on a difference from FIG. 18A.

L2 represents a difference between the luminance value (luminance values 831 and 841) of the pixel 600 having the maximum luminance and the luminance value (luminance values 832 and 842) of the pixel 600 having the minimum value according to the first embodiment of the invention.

As shown in FIG. 18B, in the first embodiment of the invention, the difference (L2) in luminance between the uppermost and lowermost write scan lines from among the write scan lines sharing the drive scan line decreases, as compared with the display apparatus 100 in which no high-level power supply potential (Vcc_H) is supplied. That is, in the first embodiment of the invention, the difference in luminance between the pixels 600 is decreased, thereby reducing gradation.

However, at the boundary of the write scan lines sharing the drive scan line (the boundary of the luminance value 832 and the luminance value 841), luminance changes by the difference L2 between the maximum luminance value and the minimum luminance value, similarly to the display apparatus 100 in which no high-level power supply potential (Vcc_H) is supplied. For this reason, it is important to prevent the boundary from being viewed by the user in accordance with the degree of moderation of gradation.

FIG. 18C shows luminance values according to the second embodiment of the invention. Similarly to the luminance value 831 shown in FIG. 18B, a luminance value 851 is luminance by each of the pixels 600 to which the write scan line (WSL1) is connected. Luminance values 853, 861, and 863 are respectively the same as the luminance values 832, 841, and 842 shown in FIG. 18B. For this reason, detailed description thereof will not be repeated. A luminance value 852 is a luminance value in each of the pixels 600, to which the previous write scan line (WSLj−1) of the lowermost write scan line is connected, from among the pixels 600 sharing the drive scan line. Similarly, a luminance value 862 is a luminance value in each of the pixels 600, to which the previous write scan line (WSL2*j*−1) of the lowermost write scan line is connected, from among the pixels 600 sharing the drive scan line.

L3 represents a difference in luminance between the luminance value (luminance values 851 and 861) of the pixel 600 having the maximum luminance and the luminance value (luminance values 852 and 862) of the pixel 600 having the minimum luminance in the second embodiment of the invention. L4 represents a difference in luminance between the maximum luminance value (luminance values 851 and 861) and the luminance value (luminance values 853 and 863) corresponding to the previous write scan line of the lowermost write scan line from among the pixels 600 sharing the drive scan line.

In FIG. 18C, with regard to the pixels 600 to which the lowermost write scan line from among the write scan lines sharing the drive scan line is connected, the potential of the drive scan line (DSL) 411 is changed to the high-level power supply potential (Vcc_H) during the light-emission period, so luminance during the light-emission period increases. Accordingly, in the pixels 600 to which the lowermost write scan line is connected, the luminance value becomes larger than the pixels 600 to which the previous write scan line of the lowermost write scan line is connected. Thus, the luminance value in each of the pixels 600 to which the lowermost write scan line is connected can be set larger than the pixel 600 having the minimum luminance from among the pixels 600 sharing the drive scan line. That is, the luminance value in each of the pixels 600 to which the lowermost write scan line is connected becomes a luminance value between the maximum luminance and the minimum luminance, for example, the luminance values 853 and 863. In FIG. 18C, it is assumed that the luminance values 853 and 863 are values smaller than the maximum luminance value by the difference L4. In this embodiment, the luminance values 852 and 862 by the pixels 600 to which the previous write scan line of the lowermost write scan line from among the write scan lines sharing the drive scan line is connected become the minimum luminance value from among the luminance values by the pixels 600 sharing the drive scan line.

As described above, if luminance regarding the lowermost write scan line from among the write scan lines sharing the drive scan line increases, a difference in luminance which becomes gradation becomes a difference L3. Since the luminance value 853 is a value between the luminance value 852 and the luminance value 861, rapid change from the minimum luminance to the maximum luminance around the boundary of gradation is moderated, as compared with the first embodiment of the invention. That is, according to the second embodiment of the invention, in addition to the effects according to the first embodiment of the invention, the boundary of gradation is unlikely to be viewed, so visible gradation can be reduced.

As described above, according to the second embodiment of the invention, if rapid change in luminance between the groups is moderated, the boundary of gradation is unlikely to be viewed, so visible gradation in the display image can be reduced.

During the light-emission period before the period P1, if the power supply potential (Vcc) is switched to the high-level power supply potential (Vcc_H), the number of inflection points where luminance rapidly changes may increase. Therefore, in the second embodiment of the invention, an example where, during the period P1, the power supply potential (Vcc) is switched to the high-level power supply potential (Vcc_H) has been described. Meanwhile, the high-level power supply potential (Vcc_H) may be adjusted such that the number of inflection points where luminance rapidly changes does not increase, and during a period before the period P1, the power supply potential (Vcc) may be switched to the high-level power supply potential (Vcc_H). For example, as shown in FIG. 17, during a period from the start of the WSL1 extinction period to the start of the WSLj−1 extinction period, the power supply potential (Vcc) may be switched to the high-level power supply potential (Vcc_H). That is, the power supply potential (Vcc) may be switched to the high-level power supply potential (Vcc_H) after the control signal has been temporarily changed to the on potential (Von) in a write scan line before a predetermined number (N) of rows from the lowermost write scan line (WSLj) from among a plurality of write scan lines sharing a drive scan line. Therefore, the luminance value of each of the pixels 600 to which the write scan lines from a write scan line before "N−1" write scan lines from the lowermost write scan line (WSLj) to the lowermost write scan line (WSLj) are connected can be increased.

For example, a method of reducing gradation may be used in which the luminance value during the light-emission period in each of the pixels 600 to which the write scan lines (WSL1) to (WSLj) are connected gradually increases so as to cancel the luminance value during the extinction period. According to this method, for example, the potential of the drive scan line (DSL) 410 may be gradually increased after the start of the extinction period of each pixel 600 to which the write scan line (WSL1) is connected and switched to the high-level power supply potential (Vcc_H).

The display apparatus according to the first and second embodiments of the invention has a flat panel shape, and may be used as the display of various electronic instruments, for example, as a digital camera, a notebook type personal computer, a mobile phone, a video camera, and the like. The display apparatus may also be used as the display of electronic instruments in all fields which displays a video signal input to an electronic instrument or a video signal generated in an electronic instrument as an image or video. Examples of the electronic instruction in which such a display apparatus is used will be described below.

<3. Third Embodiment>

[Applications to Electronic Instrument]

Figure 19:
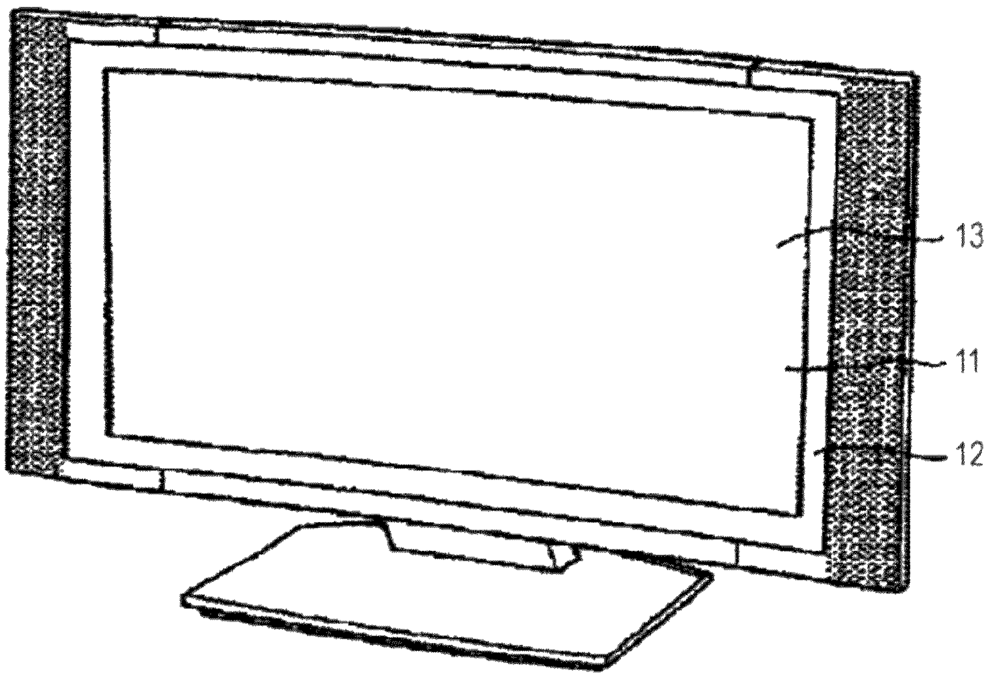
FIG. 19 is a perspective view showing a navigation set according to a third embodiment of the invention.

FIG. 19 is an example of a navigation set according to a third embodiment of the invention. This navigation set is a navigation set to which the first and second embodiments of the invention are applied. The navigation set includes a front panel 12, and a video display screen 11 formed by a filter glass 13 or the like, and is manufactured by using the display apparatus according to the first and second embodiments of the invention for the video display screen 11.

Figure 20:
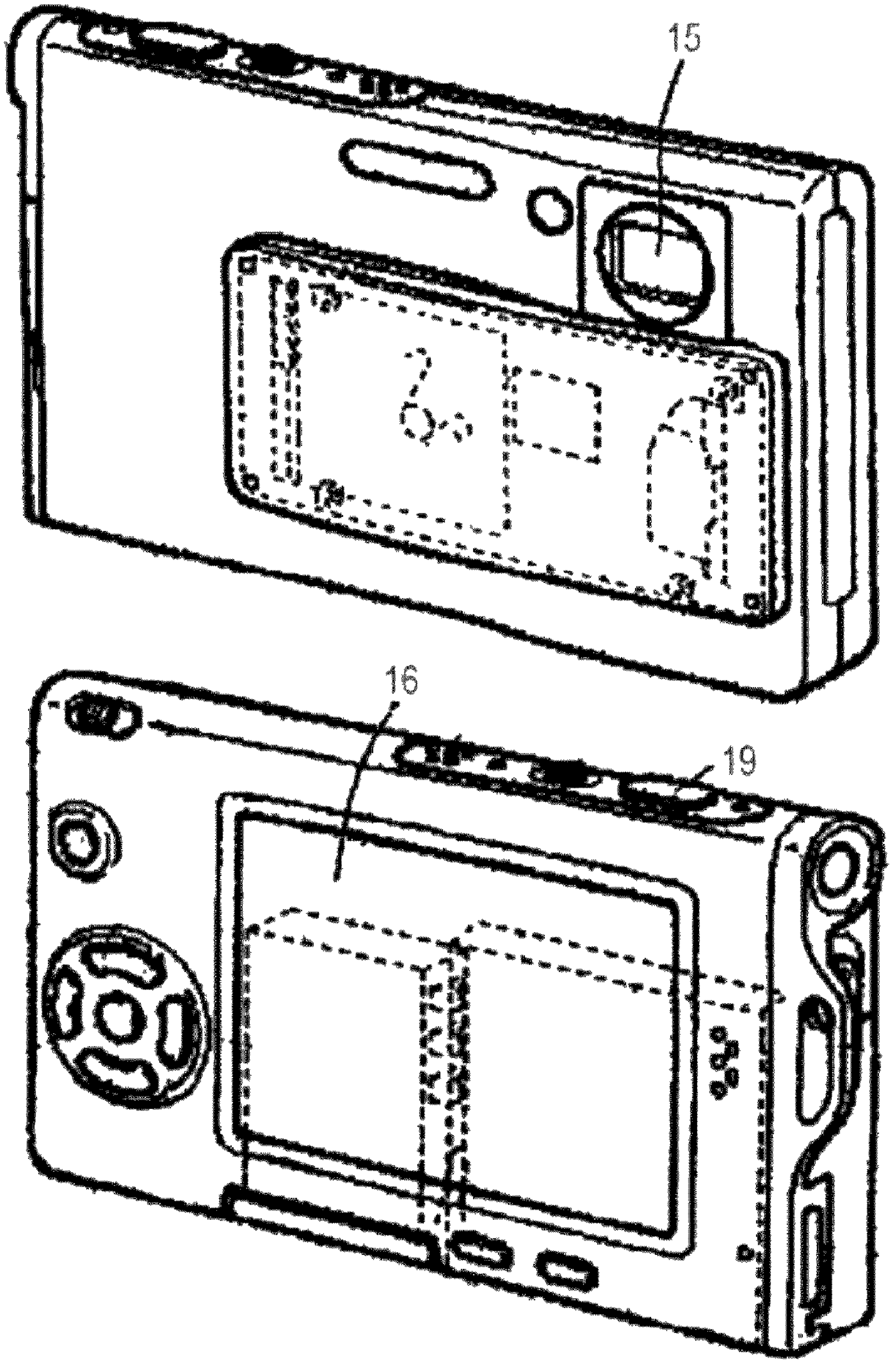
FIG. 20 is a perspective view showing a digital still camera according to the third embodiment of the invention.

FIG. 20 is a digital still camera according to the third embodiment of the invention. This digital still camera is a digital still camera to which the first and second embodiments of the invention are applied. Here, the upper portion shows a front view of the digital still camera, and the lower portion shows a rear view of the digital still camera. The digital still camera includes an imaging lens 15, a display unit 16, a control switch, a menu switch, a shutter 19, and the like, and is manufactured by using the display apparatus according to the first and second embodiments of the invention for the display unit 16.

Figure 21:
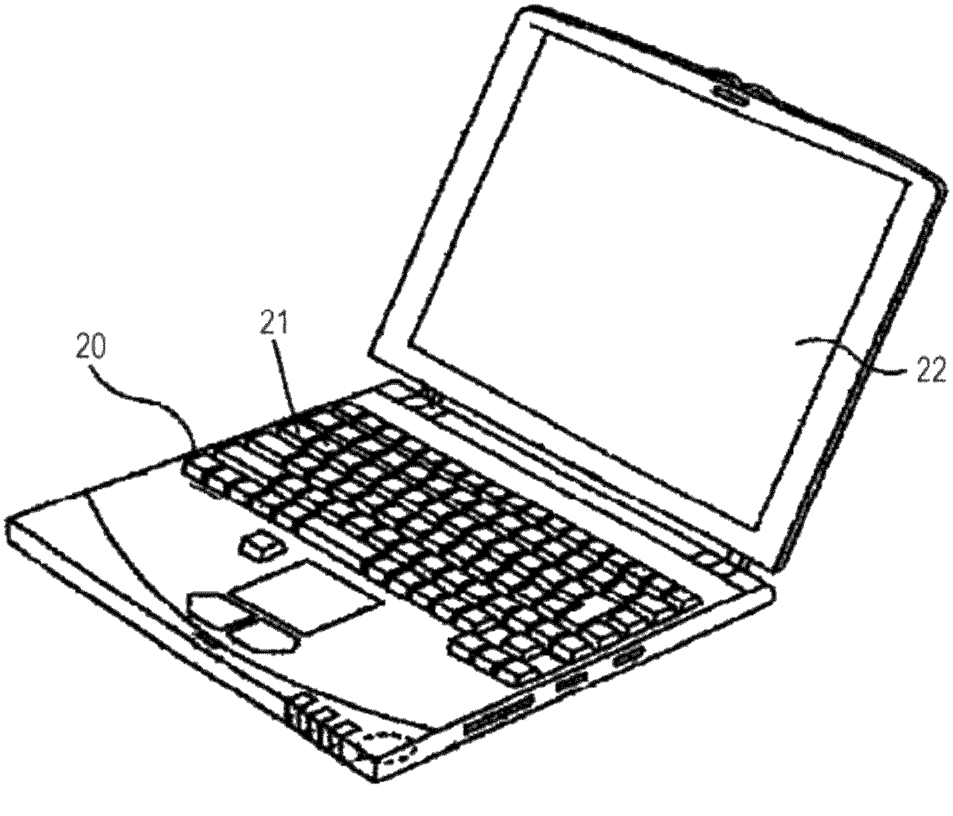
FIG. 21 is a perspective view showing a notebook type personal computer according to the third embodiment of the invention.

FIG. 21 is an example of a notebook type personal computer according to the third embodiment of the invention. This notebook type personal computer is a notebook type personal computer to which the first and second embodiments of the invention are applied. The notebook type personal computer includes, in a main body 20, a keyboard 21 which is operated when a user inputs characters and the like, and also includes, in a main body cover, a display unit 22 which displays an image. The notebook type personal computer is manufactured by using the display apparatus according to the first and second embodiments of the invention for the display unit 22.

Figure 22:
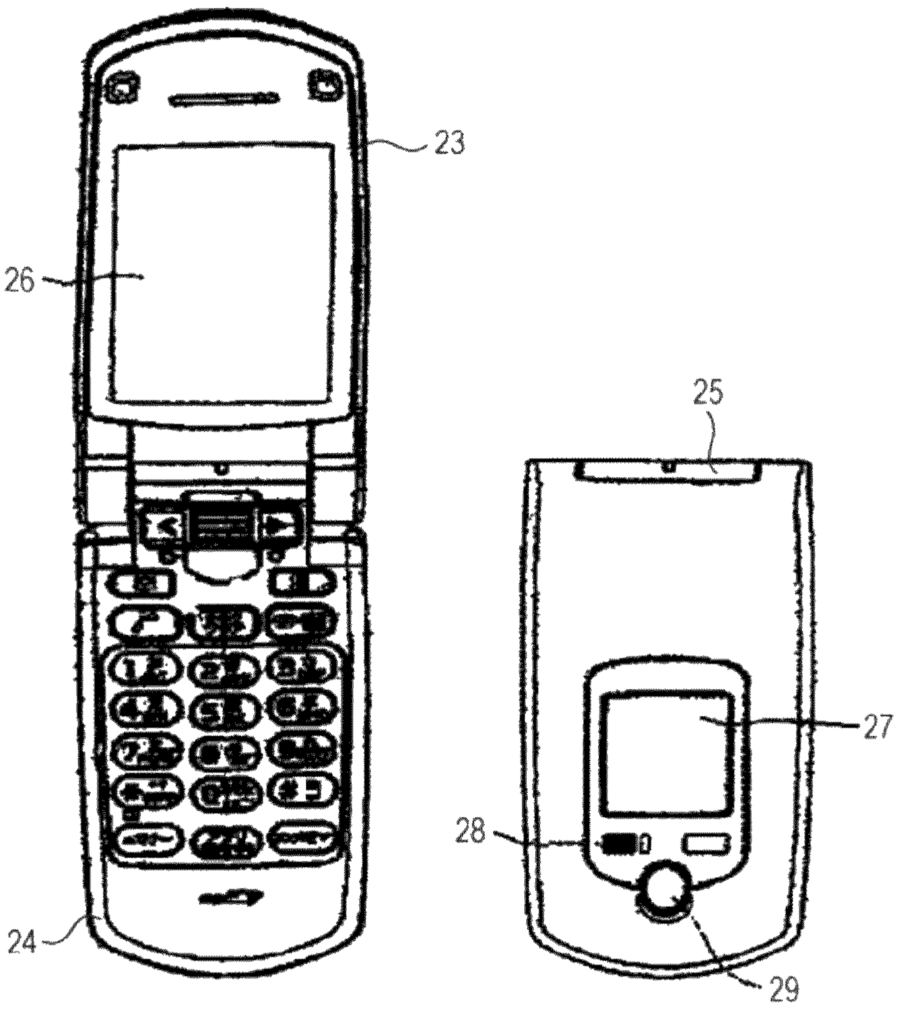
FIG. 22 is a schematic view showing a mobile terminal according to the third embodiment of the invention.

FIG. 22 is an example of a mobile terminal according to the third embodiment of the invention. This mobile terminal is a mobile terminal to which the first and second embodiments of the invention are applied. Here, the left portion shows a state where the mobile terminal is unfolded, and the right portion shows a state where the mobile terminal is folded. The mobile terminal includes an upper housing 23, a lower housing 24, a connection unit (in this case, a hinge) 25, a display 26, a sub-display 27, a picture light 28, a camera 29, and the like. The mobile terminal is manufactured by using the display apparatus according to the first and second embodiments of the invention for the display 26 or the sub-display 27.

Figure 23:
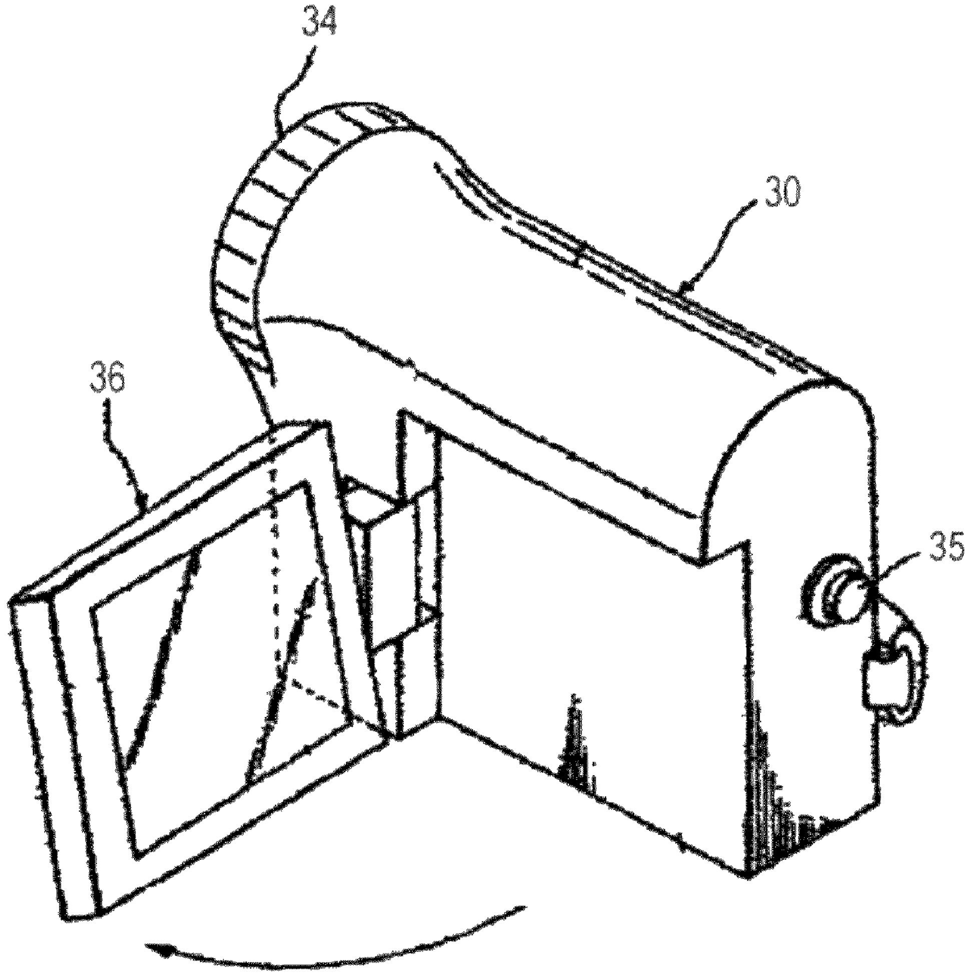
FIG. 23 is a perspective view showing a video camera according to the third embodiment of the invention.

FIG. 23 shows an example of a video camera according to the third embodiment of the invention. The video camera is a video camera to which the first and second embodiments of the invention are applied. The video camera includes a main body unit 30, a lens 34 for photographing a subject at a forward side surface, a start/stop switch 35 at the time of photographing, a monitor 36, and the like, and is manufactured by using the display apparatus according to the first and second embodiments of the invention for the monitor 36.

The embodiments of the invention are for illustration of an example for carrying out the invention, and have correspondence to the invention-specifying matters in the claims as described above. It should be noted that the invention is not limited to the embodiments, and various modifications may be made without departing from the subject matter of the invention.

The present application contains subject matter related to that disclosed in Japanese Priority Patent Application JP 2009-258645 filed in the Japan Patent Office on Nov. 12, 2009, the entire contents of which is hereby incorporated by reference.

What is claimed is:

1. A display apparatus comprising:

a plurality of pixel circuits;

drive scan lines which supply the same power supply potential to each group of the plurality of pixel circuits, the group having a plurality of pixel circuits for a plurality of successive rows; and a power supply circuit which, during an extinction period of a current scanning field for extinguishing light-emitting devices in pixel circuits belonging to each group, supplies a high-level power supply potential to the respective pixel circuits belonging to the group related to the extinction period so as to switch the power supply potential to the high-level power supply potential higher than the power supply potential, wherein, (1) each of the plurality of pixel circuits includes (a) a storage capacitor which retains a voltage corresponding to a video signal, (b) a drive transistor which supplies a current based on the voltage retained in the storage capacitor to a corresponding light-emitting device by receiving the power supply potential supplied to the corresponding drive scan line, (c) a light-emitting device which emits light in accordance with the current supplied from the drive transistor, and (d) a write transistor which, during the extinction period, gives an extinction potential for extinguishing the light-emitting device to a gate terminal of the drive transistor, and then writes the voltage corresponding to the video signal to the storage capacitor, (2) the extinction period occurs after a light emission period of a previous field and before a threshold correction preparation period of the current scanning field, and (3) during the correction preparation period the power supply voltage is at the power supply potential.

2. The display apparatus according to claim 1, wherein the power supply circuit supplies the high-level power supply potential after, during the extinction period, the extinction potential is given to gate terminals of drive transistors in pixel circuits of a last row to be extinguished by line-sequential scanning from among the pixel circuits belonging to the group related to the extinction period.

3. The display apparatus according to claim 1, wherein the power supply circuit supplies the high-level power supply potential after, during the extinction period, the extinction potential is given to the gate terminal of the drive transistor of each of pixel circuits in a row before a predetermined number of rows from a last row to be extinguished by line-sequential scanning from among the pixel circuits belonging to the group related to the extinction period.

4. The display apparatus according to claim 1, wherein the power supply circuit supplies the high-level power supply potential to the drive scan line by switching the power supply potential to the high-level power supply potential during the extinction period.

5. The display apparatus according to claim 1, wherein the light-emitting devices are organic electroluminescence devices.

6. An electronic instrument comprising:

a plurality of pixel circuits;

drive scan lines which supply the same power supply potential to each group of the plurality of pixel circuits, the group having a plurality of pixel circuits for a plurality of successive rows; and a power supply circuit which, during an extinction period of a current scanning field for extinguishing light-emitting devices in pixel circuits belonging to each group, supplies a high-level power supply potential to the respective pixel circuits belonging to the group related to the extinction period so as to switch the power supply potential to the high-level power supply potential higher than the power supply potential, wherein, (1) each of the plurality of pixel circuits includes (a) a storage capacitor which retains a voltage corresponding to a video signal, (b) a drive transistor which supplies a current based on the voltage retained in the storage capacitor to a corresponding light-emitting device by receiving the power supply potential supplied to the corresponding drive scan line, (c) a light-emitting device which emits light in accordance with the current supplied from the drive transistor, and (d) a write transistor which, during the extinction period, gives an extinction potential for extinguishing the light-emitting device to a gate terminal of the drive transistor, and then writes the voltage corresponding to the video signal to the storage capacitor, (2) the extinction period occurs after a light emission period of a previous scanning field and before a threshold correction preparation period, (3) during the correction preparation period the power supply voltage is at the power supply potential.

* * * * *